(12) United States Patent
Moed

(10) Patent No.: US 6,507,670 B1
(45) Date of Patent: Jan. 14, 2003

(54) SYSTEM AND PROCESS FOR REMOVING A BACKGROUND PATTERN FROM A BINARY IMAGE

(75) Inventor: Michael C. Moed, Roswell, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/262,902

(22) Filed: Mar. 5, 1999

Related U.S. Application Data

(60) Provisional application No. 60/076,888, filed on Mar. 5, 1998.

(51) Int. Cl.$^7$ ................................................. G06K 9/00
(52) U.S. Cl. ....................... 382/172; 382/176; 382/112; 358/464
(58) Field of Search ................................ 382/168, 171, 382/172, 176, 177, 180, 275, 270, 112; 358/456, 462, 463, 464, 455, 466, 298

(56) References Cited

U.S. PATENT DOCUMENTS

| | | | | |
|---|---|---|---|---|
| 5,555,556 A | * | 9/1996 | Ozaki | 382/173 |
| 5,889,885 A | * | 3/1999 | Moed et al. | 382/172 |
| 6,018,590 A | * | 1/2000 | Gaborski | 382/168 |
| 6,081,618 A | * | 1/2000 | Naoi et al. | 382/180 |

OTHER PUBLICATIONS

Wu et al. "Finding text in images" Proc. 2nd ACM International Conference on Digital Libraries, p. 3–12, Jul. 1997.*

Luijendijk "Automatic threshold selection using histograms based on the count of 4–connected regions" Pattern Recognition Letters 1991, vol. 12, No. 4, p. 219–28, Apr. 1991.*

* cited by examiner

Primary Examiner—Jingge Wu
(74) Attorney, Agent, or Firm—Needle & Rosenberg, P.C.

(57) ABSTRACT

A system is provided for removing a background pattern from a binary image. The system comprises a device for storing the binary image, and a processing device. The processing device may perform various steps, including (1) dividing the binary image stored in the storage device into a plurality of stored image regions, (2) for each of the plurality of stored image regions, calculating the image density value associated with such stored image region, (3) counting the number of stored image regions associated with each image density value, (4) identifying the image density values having the maximum number of associated stored image regions, (5) selecting as a threshold density value a less dense value from the identified image density values, and (6) for each stored image region stored in the storage device having a density value less than the threshold density value, resetting the stored image region to a zero value.

4 Claims, 24 Drawing Sheets

4-CONNECTED NEIGHBORS OF CENTER PIXEL

8-CONNECTED NEIGHBORS OF CENTER PIXEL

SEVERAL CONNECTED COMPONENTS

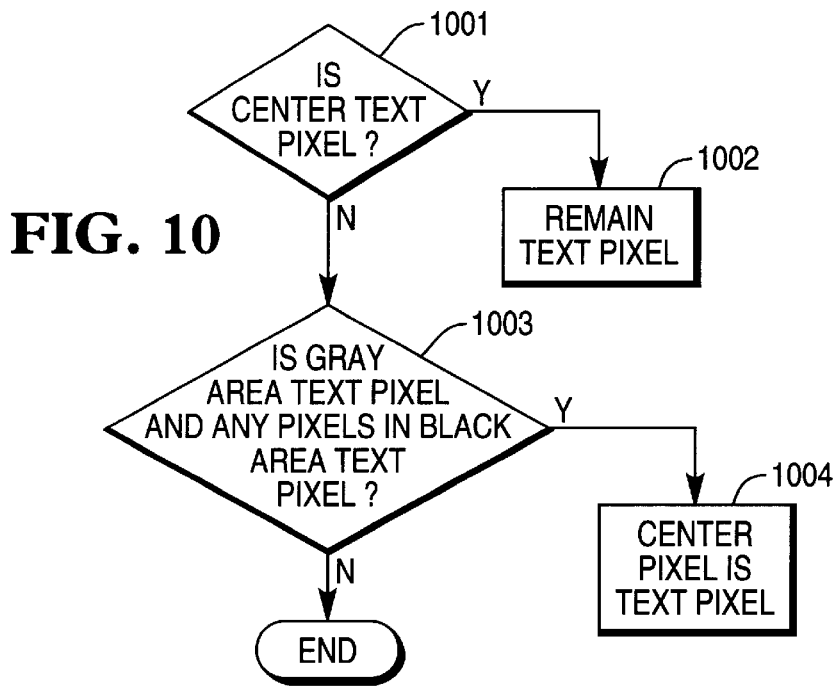
FIG. 10
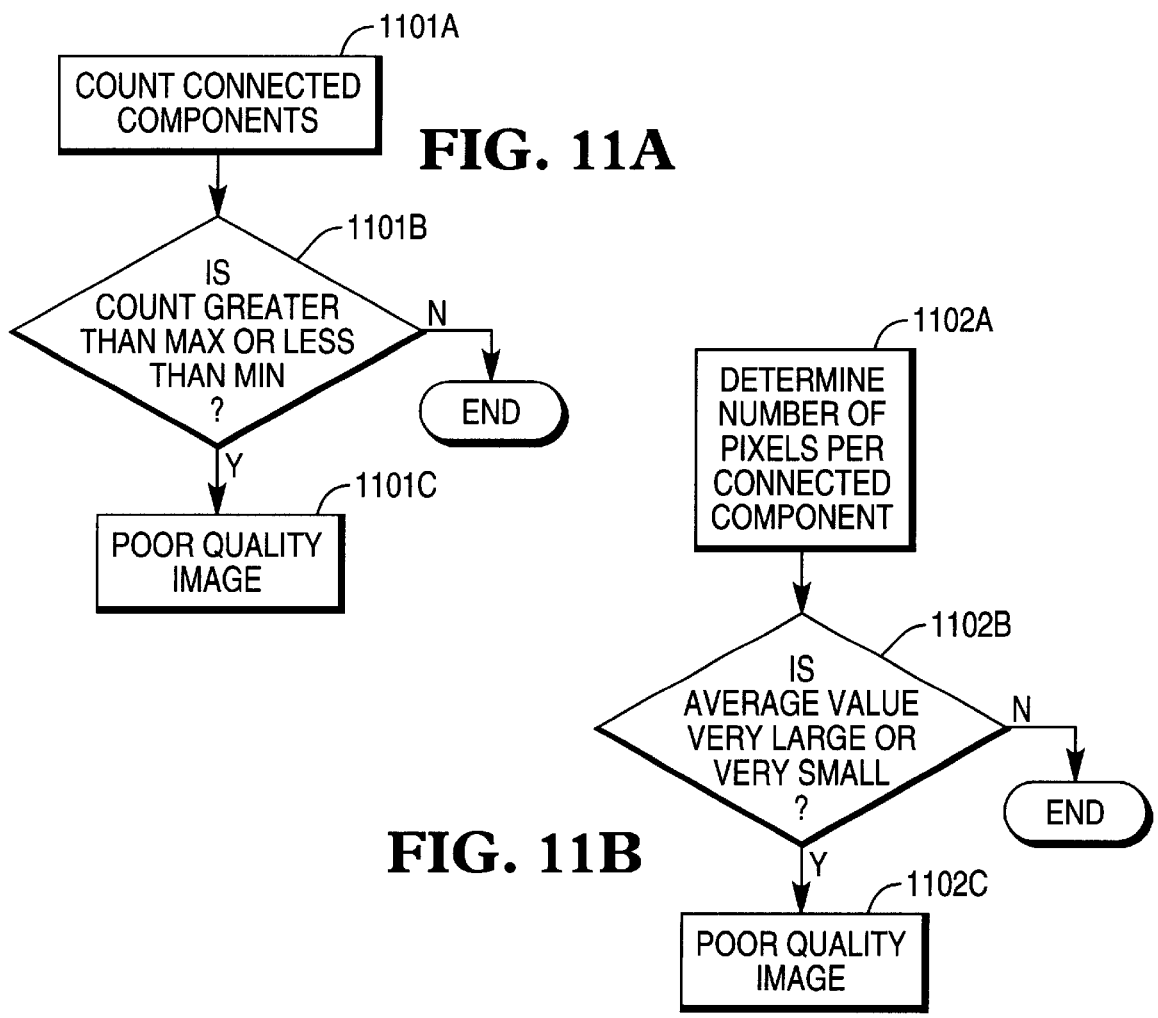
FIG. 11A
FIG. 11B

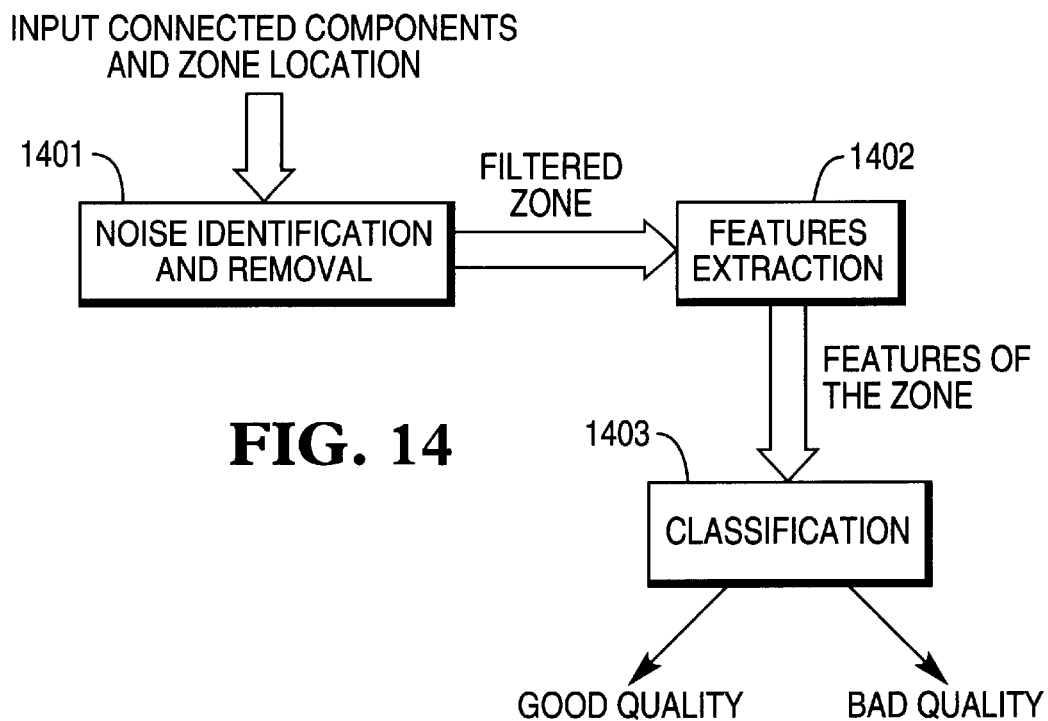
FIG. 14
FIG. 15A
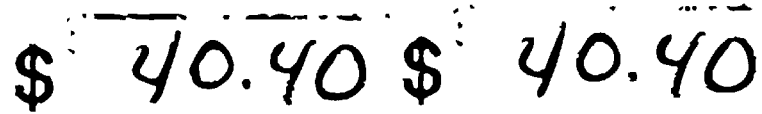
FIG. 15B

FIG. 18A
1801
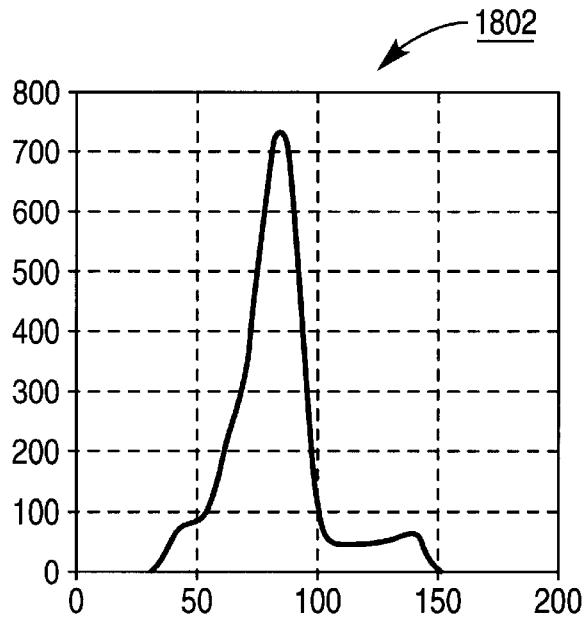
FIG. 18B
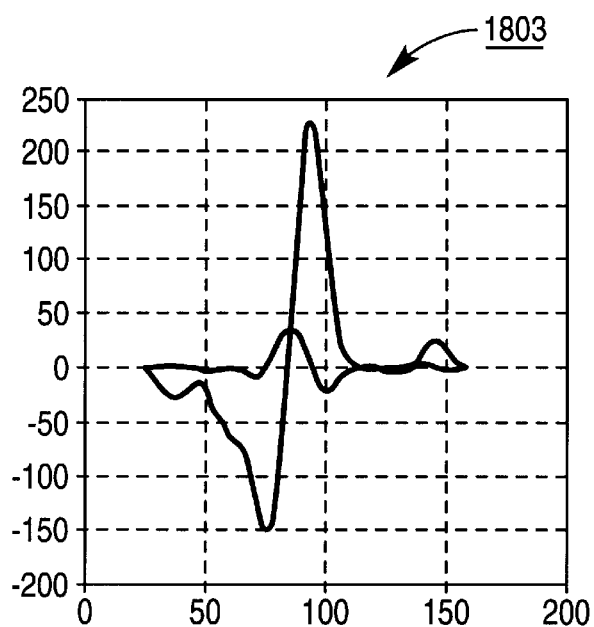
FIG. 18C

FIG. 19A
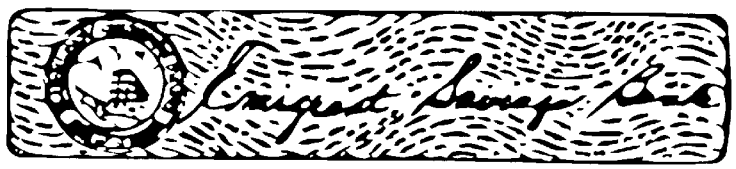
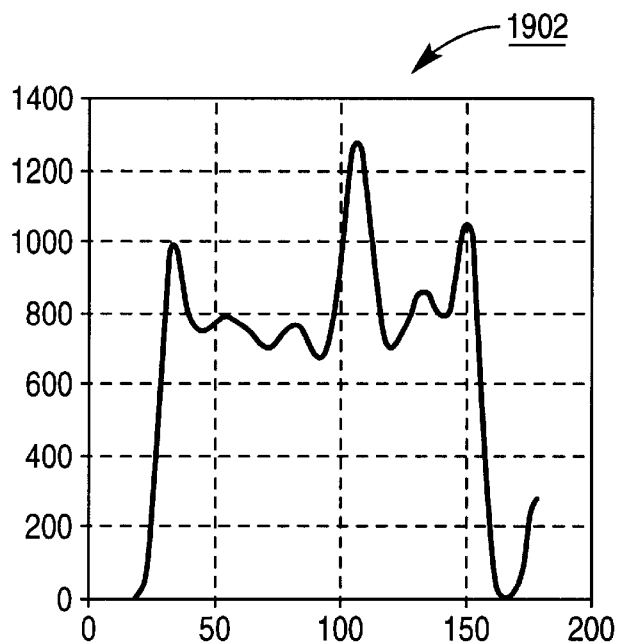
FIG. 19B
FIG. 19C
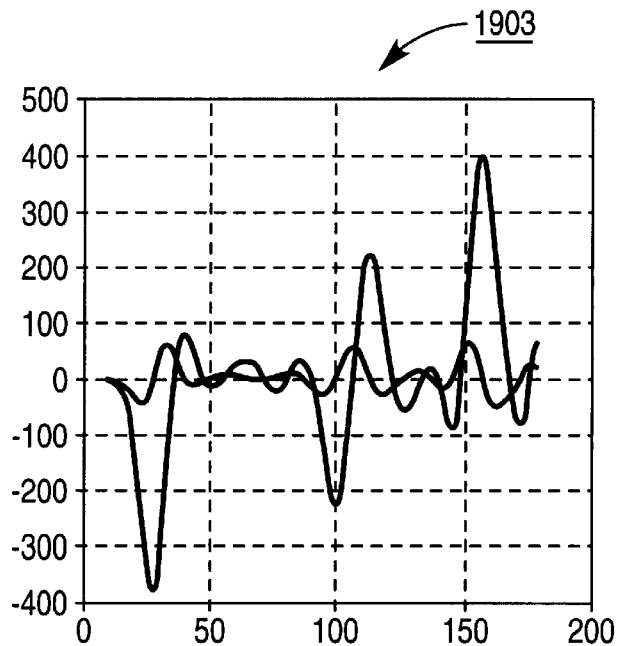

SYSTEM AND PROCESS FOR REMOVING A BACKGROUND PATTERN FROM A BINARY IMAGE

This patent application claims the benefit of U.S. Provisional Patent Application Serial No. 60/076,888, filed Mar. 5, 1998, and entitled "Image Quality Assurance for Proper Handling of Financial Documents".

BACKGROUND OF THE INVENTION

1. Field of the Invention

The present invention relates generally to analyzing and improving video images, and specifically to a system and process for detecting discontinuities in text characters, such as those caused by dot matrix printing, and for improving the quality of such characters.

2. Description of the Prior Art

The ability to identify and locate relevant information within images of item-sized documents, such as financial documents (personal checks, business checks, etc.), is currently a feature of products offered by NCR Corporation, such as the NCR 7780, NCR ImageMark, and the NCR DP-ATM ImageMark. With respect to an image of a document such as a personal check, these products can identify and locate the various types of information contained therein, such as courtesy amount, legal amount, date, signature, payee, etc. The identified portions of the document can then be used in a variety of ways to help automate the processing of these documents. Of course, these systems can have a variety of applications, not just within the financial document processing field.

Several types of quality problems can occur in document images. For example, information can occur unexpectedly in an image which consequently does not match document or field models. Conversely, an image may be missing important expected information. These problems may occur for a number of reasons, including:

The image capture process may have failed.

The item may have been misaligned, skewed, or misoriented during image capture.

The image may have been poorly thresholded.

The image may contain excessive noise.

The item may contain additional unexpected printed information, such as an annotation on a personal check.

Preprinted item graphics may interfere with needed field information in the image.

There may be false or misleading information on the document.

With respect to the financial industry in particular, the ability to determine the quality of images of financial documents has become increasingly important as banks begin to migrate from a paper-based environment to an image-based one. Without a reliable measure of image quality, banks do not know if financial document images contain the same information as their paper counterparts. If information is missing from these images, such as a courtesy zone, required transactions involving this information may be negatively affected. By assessing the quality of a document, as well as the quality of fields on the document, the bank can determine the set of transactions for which the image can be used, and determine if the paper document must be retained.

There therefore exists a need in the art for an improved system that automatically and accurately evaluates the quality of a document image, rejects the document image if necessary, with feedback to the user, etc., and/or repairs the image so that the document can be properly handled.

SUMMARY OF THE INVENTION

A system is provided for removing a background pattern from a binary image. The system comprises a device for storing the binary image, and a processing device. The processing device may perform various steps, including (1) dividing, the binary image stored in the storage device into a plurality of stored image regions, (2) for each of the plurality of stored image regions, calculating the image density value associated with such stored image region, (3) counting the number of stored image regions associated with each image density value, (4) identifying the image density values having the maximum number of associated stored image regions, (5) selecting as a threshold density value a less dense value from the identified image density values, and (6) for each stored image region stored in the storage device having a density value less than the threshold density value, resetting the stored image region to a zero value.

BRIEF DESCRIPTION OF THE FIGURES

FIG. 10 illustrates a process that may be performed to apply the morphological filters of FIGS. 9A–9H to an image.

FIGS. 11A–11E illustrate various methods for assessing image quality based upon connected component analysis.

FIG. 14 illustrates a process for analyzing the quality of hand-printed characters within an image.

FIGS. 15A–15B illustrate images before and after line removal.

FIGS. 18A–18C and 19A–19C illustrate example signature images, the horizontal projections for the signature images, and the derivatives of the horizontal projections.

DETAILED DESCRIPTION OF THE INVENTION

Figure 1:
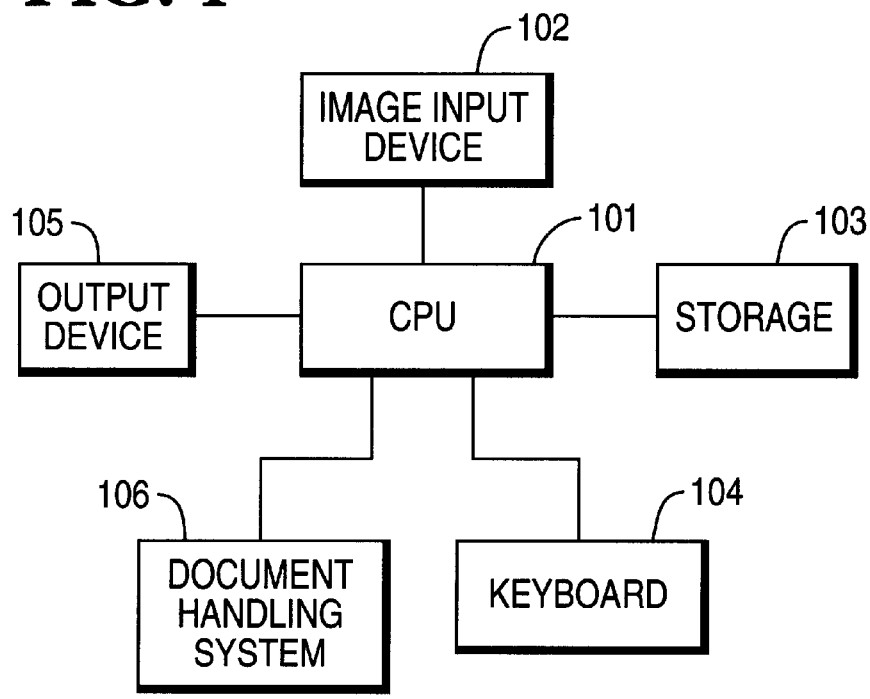
FIG. 1 illustrates the various hardware components with which the teachings of the present invention may be implemented.

A preferred embodiment of the invention is now described in detail. Referring to the drawings, like numbers indicate like elements throughout the views.

1. Overall Invention Implementation

With respect to FIG. 1, a block diagram is shown illustrating the basic hardware components with which the present invention may be implemented. In one embodiment, all of the processes and methods described herein may be implemented as software operating on a standard personal computer (PC) platform, under Windows NT or equivalent operating system. The various components in FIG. 1 need not be separate physical components, but may all comprise a single computing system. Of course, one of ordinary skill in the art will recognize that the components described above represent merely one embodiment of the platform upon which the present invention may operate. Suitable modifications may be made based upon the particular application of the present invention.

The various processes of the present invention, described in further detail later, may be performed by the CPU 101, in combination with the other components of FIG. 1. The CPU 101 may be programmed to perform these processes in a variety of ways, but in one embodiment may be programmed using the Visual C++ development platform, under the Windows NT platform. The various processes performed by CPU 101 are described below.

2. Operation of Invention

Figure 2A:
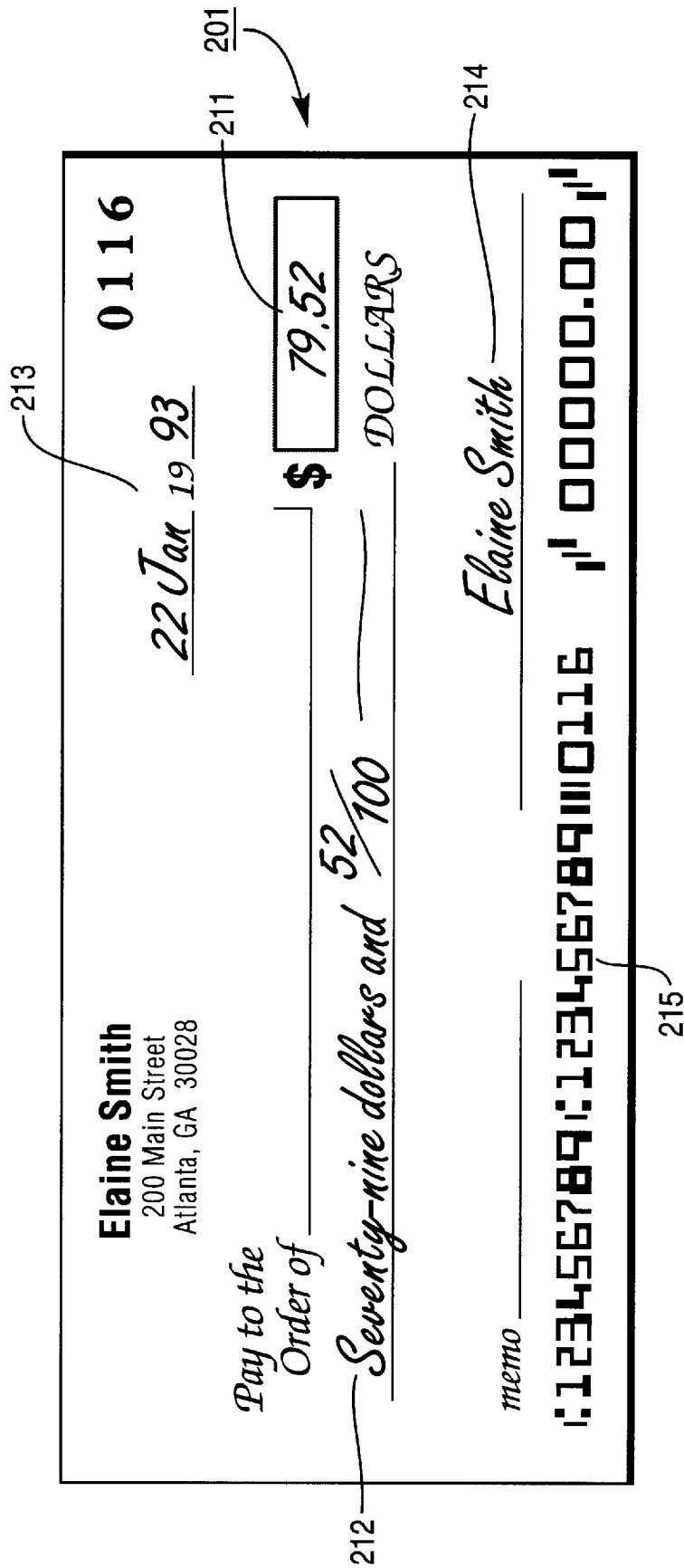
FIGS. 2A–2B illustrate sample images of checks that may be analyzed in accordance with the present invention.
Figure 2B:
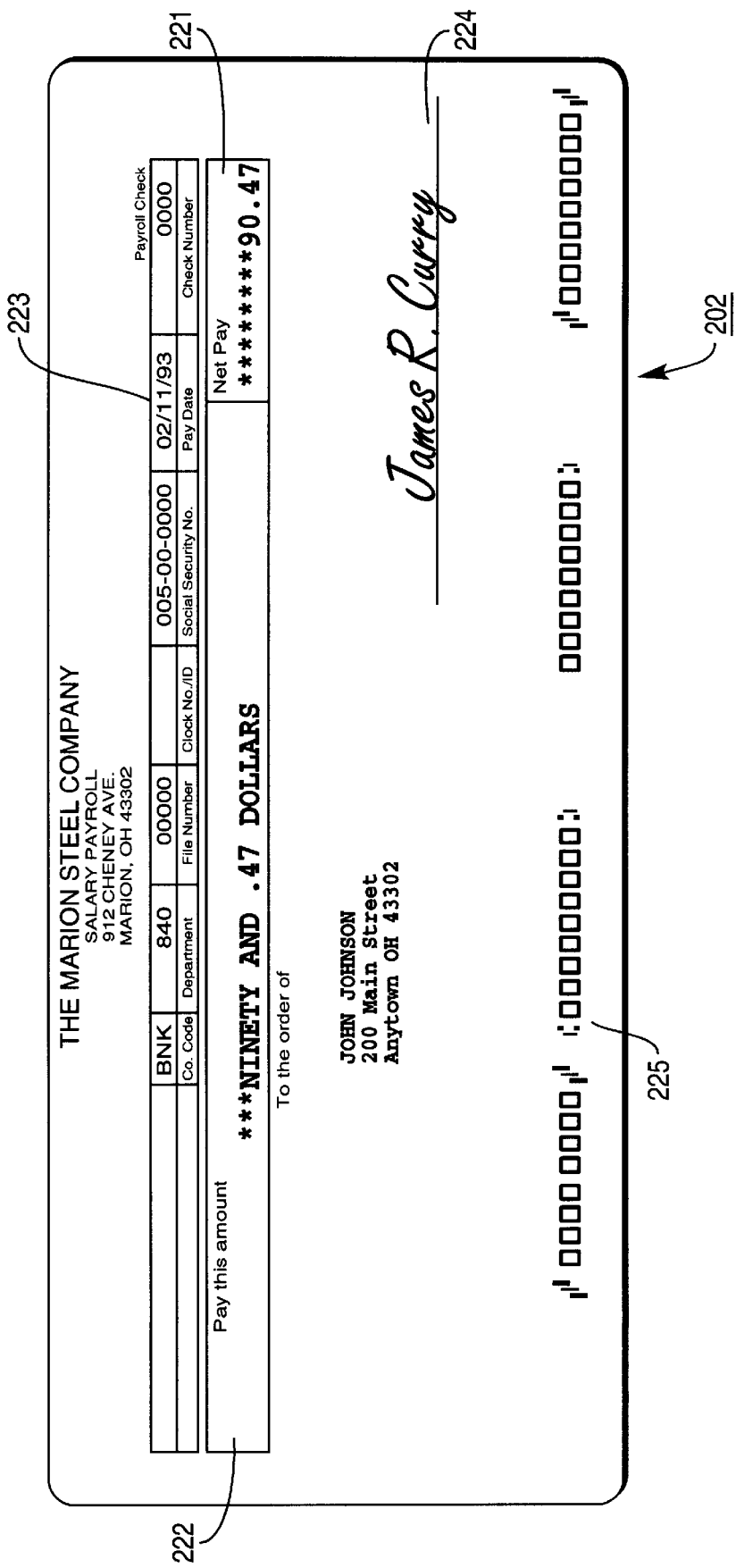

FIGS. 2A and 2B depict images of sample documents, in this case typical U.S. personal and business checks, that may be analyzed and/or repaired in accordance with the teachings of the present invention. While for purposes of the present discussion the present invention will be described with respect to the analysis and/or repair of images of financial documents, it will be understood that the teachings of the present invention may be applied to other types of documents as well.

With respect to FIGS. 2A and 2B, digitized images 201, 202 of a personal check and business check, respectively, are shown. In one embodiment, images 201 and/or 202 may be stored in storage device 103 in any one of a variety of formats, such as JPEG, TIFF, and at any suitable resolution, such as 200 dpi. The CPU 101 may thereafter process the images according to one of the processes described later. Note that the checks and other financial documents illustrated within the present specification, while based upon real financial documents, have been "sanitized" so as to remove all references to real account numbers, names, etc.

For each document image 201, 202, the following pieces of information are deemed to be important to successfully process the item:

courtesy amount 211, 221
legal amount 212, 222
date 213, 223
signature 214, 224
codeline or MICR (code used to denote the bank ID and account number) 215, 225

Figure 3A:
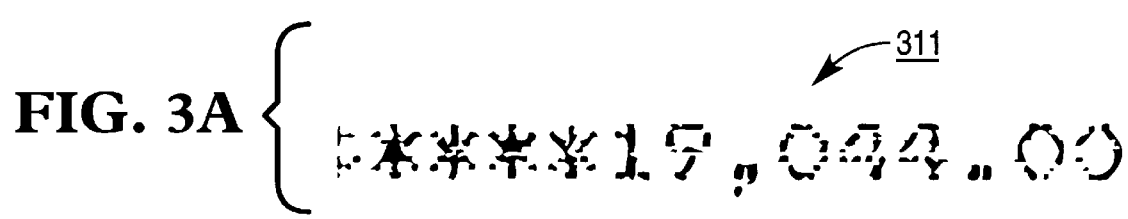
FIGS. 3A–3I illustrate images within which certain quality problems are present.
Figure 3B:
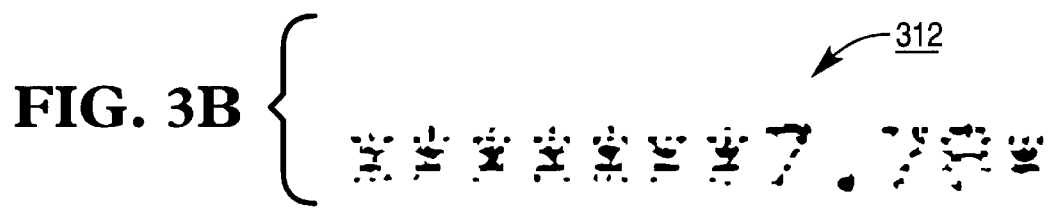
Figure 3C:
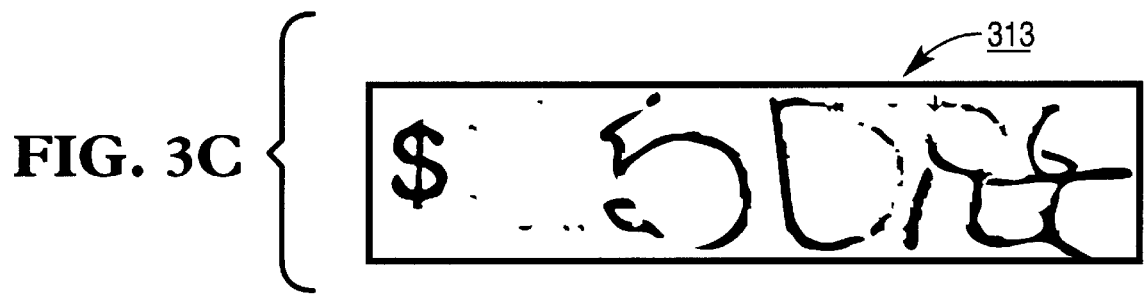
Figure 3D:
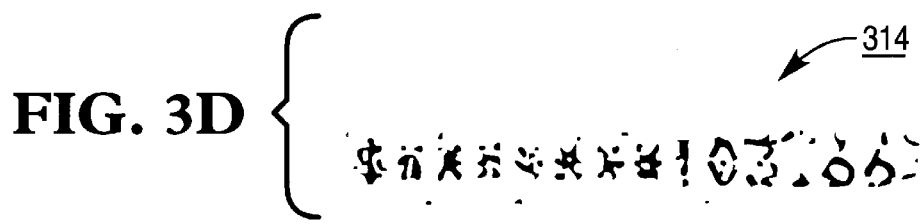
Figure 3E:
Figure 3F:
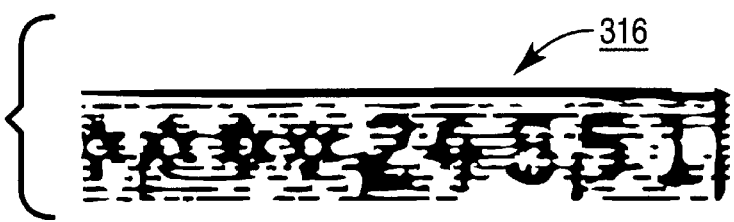
Figure 3G:
Figure 3H:
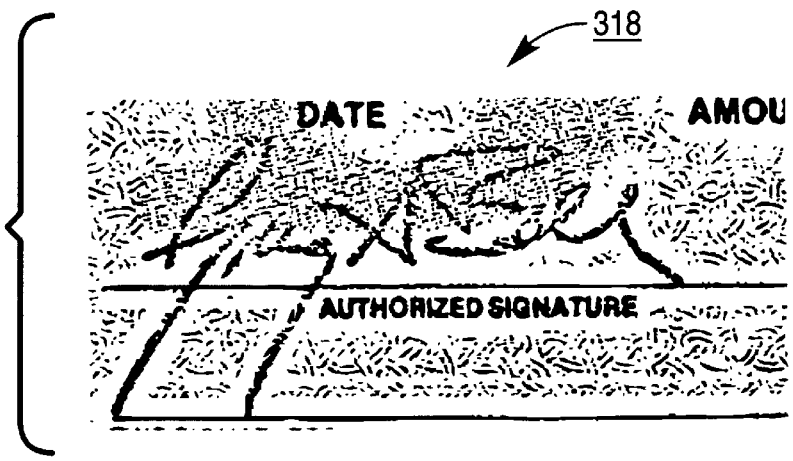
Figure 3I:

Insufficient quality in any one of these fields on the item image 201, 202, may normally cause the item to be misread, mishandled, or rejected by the document handling system 106. For example, FIGS. 3A–3I depict images within which certain quality problems are present. FIGS. 3A, 3B and 3C include machine-printed characters 311 and 312 and hand-printed characters 313 within the image, all having broken, non-continuous characters. FIGS. 3D and 3E include various types of "noise" 314, 315 within the image. FIGS. 3F and 3G include strong, interfering backgrounds 316, 317 within the image. Finally, FIG. 3H includes an unreadable signature 318 within the image, and FIG. 3I includes within the image an improper (too large) font size 319 for automatic recognition.

A. Machine Print Quality Evaluation and Correction

In order to detect and/or correct the quality problems typically associated with document images, such as those depicted in FIGS. 3A–3I, "connected component" analysis may be performed in each field of interest. Sets of connected black pixels may be isolated, and measurements performed on each individual connected component. Such measurements may be combined with overall statistical measures on the connected components for the entire field of interest in order to determine different quality aspects.

Figure 4A:
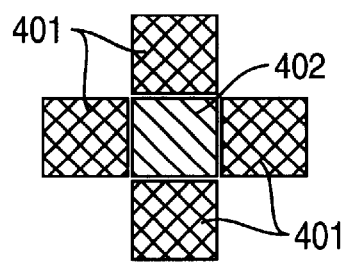
FIGS. 4A–4B illustrate connected neighbor analysis that may be performed by the present invention, and FIG. 4C provides examples of both small and large connected components.
Figure 4B:
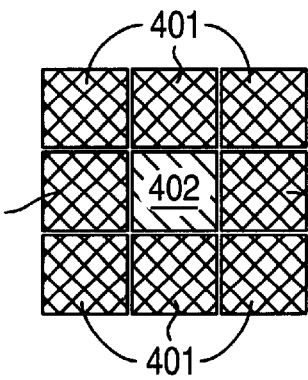
Figure 4C:
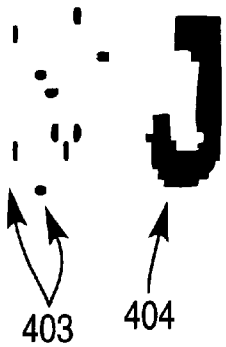

Processing each pixel in a binary image can be slow and computationally expensive. One way to improve the efficiency of binary image processing method is to convert binary pixels into connected components. More specifically, a connected component is a grouping of the black pixels which are physically touching in the binary image. The grouping criteria can be 4-connected, where only top, bottom, left and right pixels are considered as possible neighbors, or they can be 8-connected, where pixels touching on the diagonal are also considered. The methods employed in the present invention use the 8-connected technique, although it will be readily recognized that the 4-connected technique may be used as well. FIGS. 4A and 4B show 4 and 8-connected neighbor pixels 401 (indicated in black) of the center (gray) pixel 402, and FIG. 4C provides examples of both small 403 (noise) and large 404 (character) connected components.

For a given field of interest (such as in one of the regions of image 201, 202, etc. for example, the courtesy zone 211, 221), all the connected components are generated. The connected components are organized in such a way that many features can be extracted directly from the individual connected components, without revisiting each pixel, thereby saving processing time. Many of the processes developed for assessing quality utilize the same features of the connected components, which only need to be extracted once.

In order to analyze image quality based upon connected components, one of a variety of techniques may be used. An example of a mechanism that is used to generate the connected components is the Net32K system, available from AT&T Laboratories of Holmdel, N.J. The Net32K product may be modified so as to provide direct access to connected component members through public member functions. The execution time required to generate the connected components is minimal due to the small zone size.

Various methods for assessing image quality based upon connected component analysis are depicted in FIGS. 11A–11E. As a precursor to any of these methods, small connected "particles" are filtered out of the zone image, which removes speckle noise and increases the reliability of the measures.

The image quality assessment method of FIG. 11A is described below. The reference numerals in [brackets] below refer to like-numbered reference numerals in the figure.

[1101A] Count the total number of connected components.

[1101B] Is this count greater than a MAX threshold or less than MIN threshold.

[1101C] If so, the image can be classified as a poor quality image.

The image quality assessment method of FIG. 11B is described below. The reference numerals in [brackets] below refer to like-numbered reference numerals in the figure.

[1102A] Determine the number of pixels per connected component.

[1102B] Is the average value across the connected components in the region very large or small based on a set of thresholds?

[1102C] If so, the image may be classified as poor.

Figure 11C:
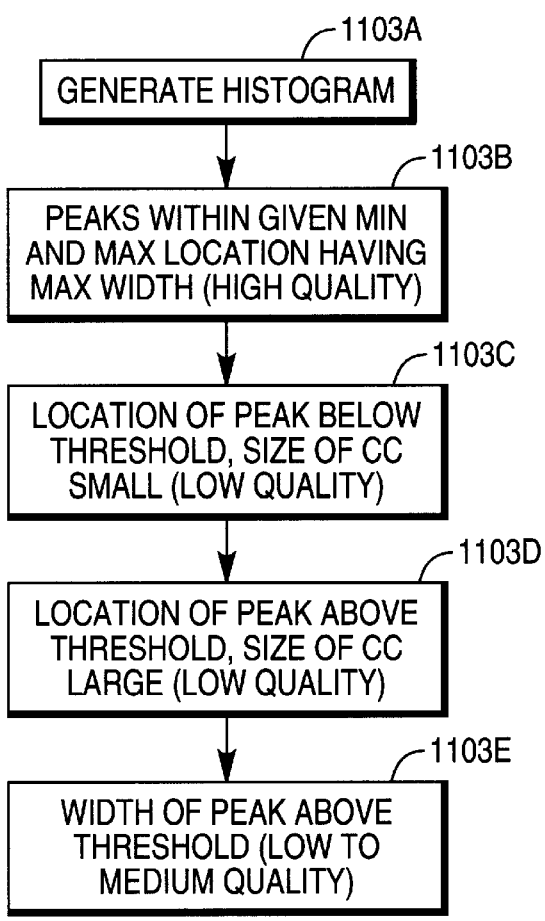

The image quality assessment method of FIG. 11C is described below. The reference numerals in [brackets] below refer to like-numbered reference numerals in the figure.

Figure 12:
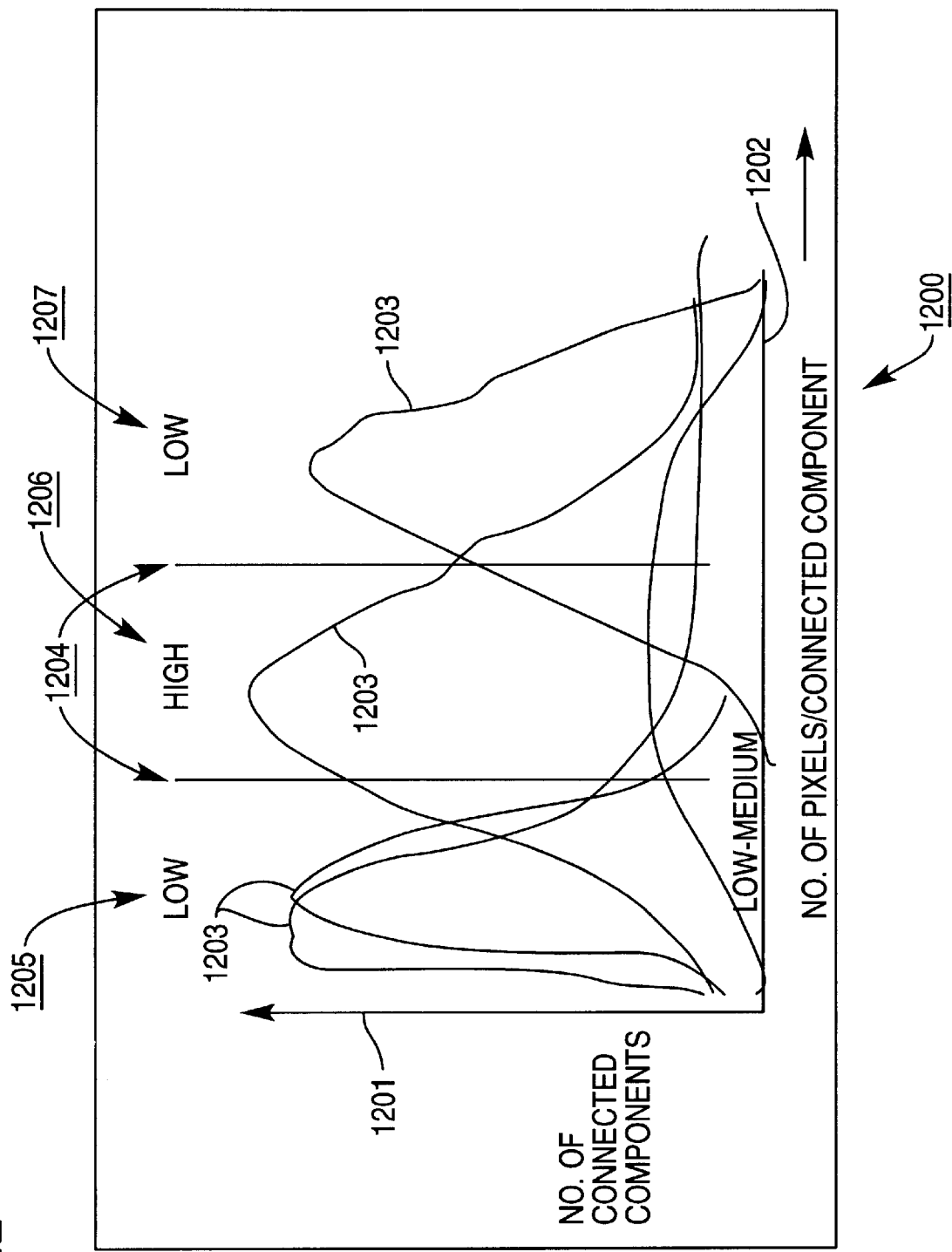
FIGS. 12–13 illustrate varuious histogram types that may be used by the present invention.

[1103A] Generate a histogram 1200, such as the sample histogram depicted of FIG. 12, for the number of connected components (axis 1201) indexed by the number of pixels per connected component (axis 1202). Analyze the lines 1203 of the histogram as follows: Line 1203 shows 5 possible histograms (representing 5 separate image "clips") all plotted on the same set of axes. The vertical dashed lines 1204 show the separation of ranges of Pixels/CC that are considered to be low or high quality. The first range 1205 (between the Y axis and the first dashed line) represents small values for Pixels/CC. The second range 1206 (between the two dashed lines represents medium values for Pixels/CC. The third range 1207 (after the second dashed line) represents large values for Pixels/CC. Two of the histograms peak in the first range, and therefore have a large number of low values for Pixels/CC, and therefore the quality for these images is low. One histogram peaks in the second range, and therefore has a large number of medium values for Pixel/CC, and therefore the quality is high for this image. One histogram peaks in the third range, and therefore has a large number of high values for Pixel/CC, and therefore the quality is low. The last histogram has no strong narrow peak, but tends to the second range, and therefore has low-medium quality.

[1103B] In general, a good image should have fairly uniform sized characters, which corresponds to a narrow peak in the histogram. The location of the peak corresponds to the font size of the zone. The width of the peak, as measured by the standard deviation of points around the peak, corresponds to the uniformity of the characters. Peaks within a given minimum and maximum location that have a maximum width are considered high quality zones.

[1103C] If the location of the peak is below a given threshold (the first vertical dashed line in FIG. 12), and the size of the connected components is small, this signifies broken characters. The quality rating is low.

[1103D] If the location of the peak is above a given threshold, the size of the connected components is large threshold (the second vertical dashed line in FIG. 12), and this signifies joined characters. The quality rating is low.

[1103E] If the width of the peak, as measured by the standard deviation, is above a threshold, then the distribution of character sizes is large. This signifies that some broken characters and some joined characters may exist. The quality rating is low to medium, depending on the value of the width.

Figure 11D:
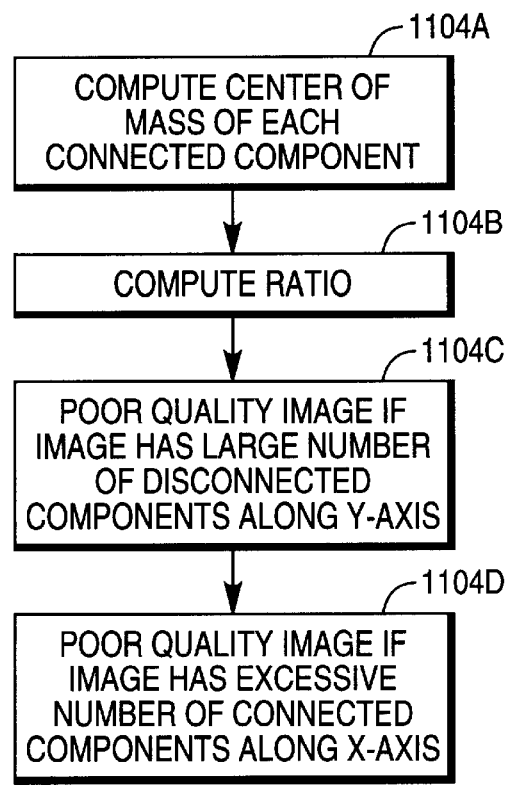

The image quality assessment method of FIG. 11D is described below. The reference numerals in [brackets] below refer to like-numbered reference numerals in the figure.

[1104A] Compute the center of mass (XCM, YCM) of each connected component using the formula:

$$XCM = \frac{\sum_{i=1}^{n}(m_i * x_i)}{\sum_{i=1}^{n} m_i}$$

$$YCM = \frac{\sum_{i=1}^{n}(m_i * y_i)}{\sum_{i=1}^{n} m_i}$$

where $m_i$ is the mass of each point $x_i$, $y_i$.

[1104B] The average ratio of the number of connected components to the x component of the center of mass and the average ratio of the number of connected components to the y component of the center of mass may be used as additional measures of print uniformity, and provide a quality assessment of the image zone.

[1104C] If the image has a large number of disconnected components along the y- axis (for a given x region) it may mean that the print may be discontinuous and therefore classified as a poor image.

[1104D] Similarly excessive number of connected components along the x direction may reflect poor quality images.

Figure 13:
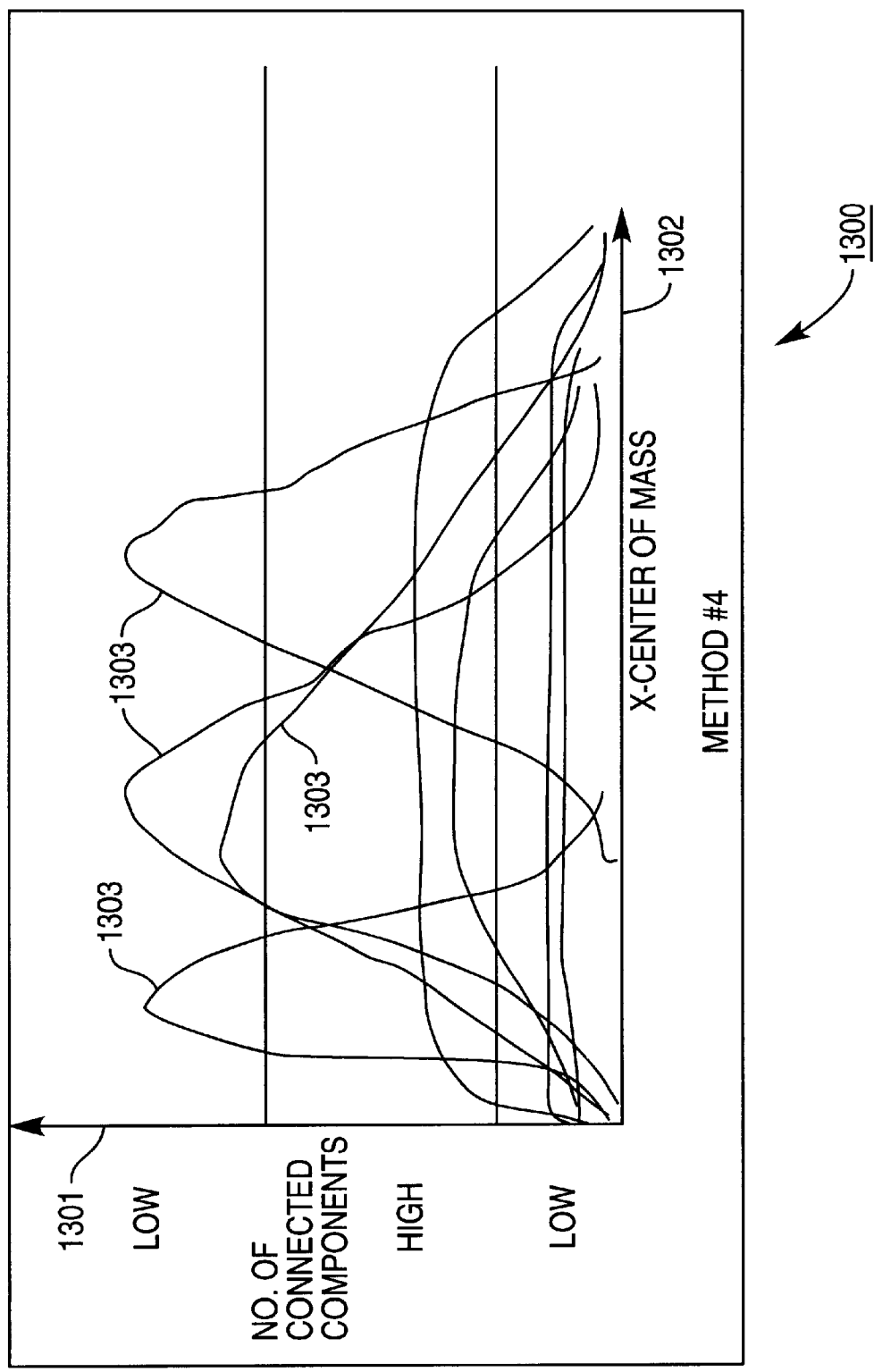

The method of FIG. 11D is depicted in further detail in the lines 1303 of the histogram 1300 of FIG. 13, which includes axis 1301 corresponding to the number of connected components, and axis 1302 corresponding to the center of mass.

Figure 11E:
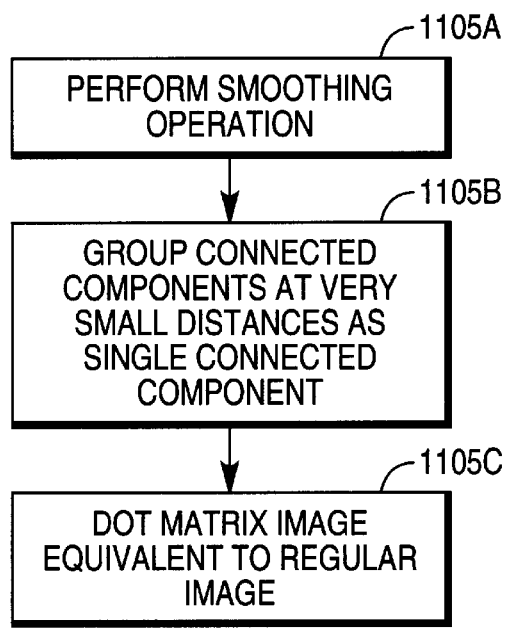

The image quality assessment method of FIG. 11E is described below. The reference numerals in [brackets] below refer to like-numbered reference numerals in the figure.

[1105A] High quality dot matrix images may have disconnected components which may lead them to be classified as poor quality images. To overcome this problem, a limited radius, connected-component based, morphological smoothing operation may be performed before attempting an analysis of the quality of the image.

[1105B] In the morphological operation, connected components at very small distances are grouped as a single connected component.

[1105C] Once this grouping is completed, the dot matrix image is equivalent to a regular image for analysis purposes.

In order to assess the quality of machine print within a document, such as that created by a dot matrix, laser or ink jet printer (e.g., the dot matrix print of FIGS. 3A and 3B), a secondary process described below has been developed. This process inspects a machine printed field of text, and determines the following informational elements:

font size broken dot matrix print or not severity of broken characters amount of background noise and patterns Skewed/Italicized or neither Character spacing (proportional or fixed)

To obtain this information, a variety of tests are performed in the field of interest. The tests overlap in their goals, so that multiple pieces of information can be used to make a decision. The tests are summarized in Table 1 below.

TABLE 1

| Test Name | Goals | Steps | Indications |
| --- | --- | --- | --- |
| Horizontal Projection with Smoothing | Indicate noise Estimate font | Project connected components horizontally. Examine projection peaks. | Central, widest peak is font height. Side, smaller peaks indicate noise. |
| Mass Distribution | Detect noise Detect BG Detect broken dot matrix print | Build a histogram of connected component sizes (i.e. # of pixels/connected component). | Small mass peak signals noise, broken dot matrix. Very large mass peak signals BG. |
| Horizontal Dot Matrix Detection | Confirm broken dot matrix print | Use horizontal projection. Examine peak-to-peak frequency. | Small, regular peak-to-peak frequency signals broken dot matrix. |
| Vertical Projection with Smoothing | Detect noise and background | Project connected components vertically. Examine projection peaks and troughs. | Irregular trough-to-trough frequency indicates noise/BG. Poor trough:peak ratio indicates noise/BG. |
| Density | Detect noise and background | Use horizontal projection. Calculate total connected components mass in each peak. | Mass should be concentrated in central peak for clean image. |

In Table 1 above, horizontal projection indicates the summation of text pixels along the X axis of the field, and vertical projection indicates the summation of text pixels along the Y axis of the field. Examples of two horizontal projection graphs illustrating this are provided in FIGS. 5A and 5B. In both FIGS. 5A and 5B, the x-axis represents the nth row of pixels in the field counting from the bottom, and the y-axis represents the number of text pixels which are black in that row of the field.

Figure 5B:
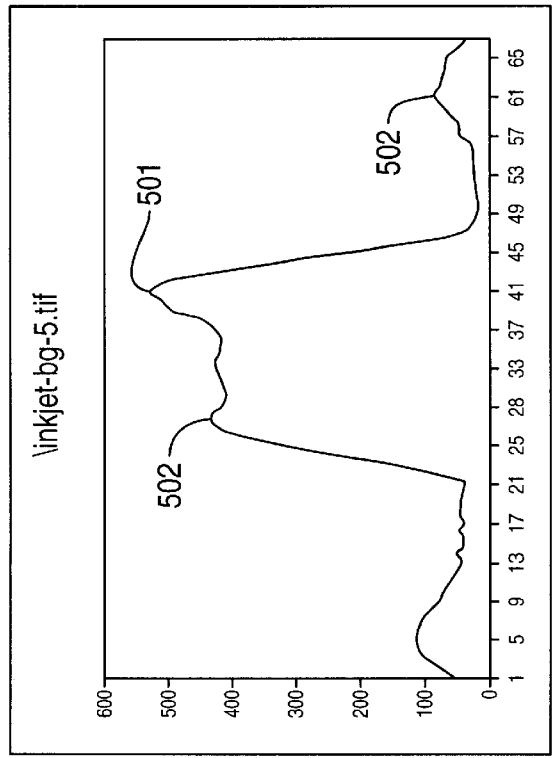
FIGS. 5A–5B illustrate sample horizontal projection graphs that may be used with the present invention.
Figure 5A:
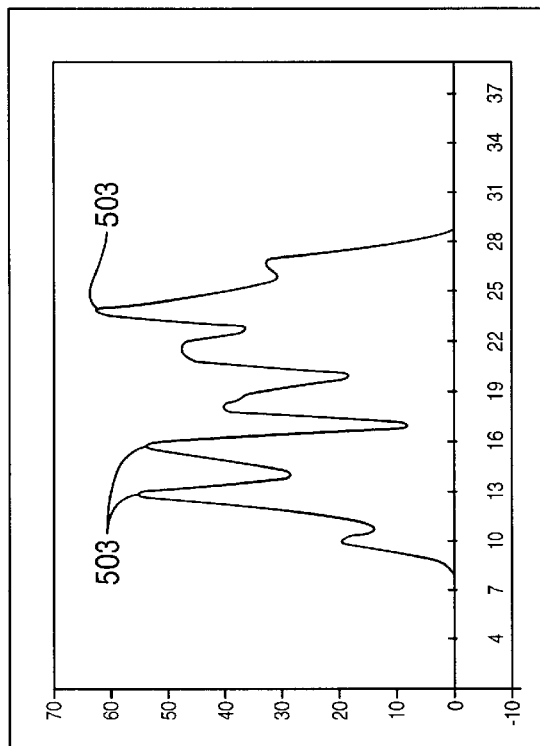

In FIGS. 5A and 5B, the sample images 510 and 520, respectively, are shown above their respective graphs. In FIG. 5A, the central peak 501 indicates the font size, while the presence of small peaks 502 to the left and right of the central peak indicates noise. In FIG. 5B, the regular frequency 503 of peaks and valleys indicates broken dot matrix print. As previously described, the X axis of FIGS. 5A and 5B corresponds to the "row number" of the image clip. The Y axis corresponds to the number of black pixels in that row.

If an image (e.g., 510 in FIG. 5A, or 316 and 317 in FIGS. 3F and 3G) is found to have noise or background, a density filter may be applied to remove the interfering patterns from the field. This repairs the image, and allows automatic reading techniques to be applied.

Figure 6:
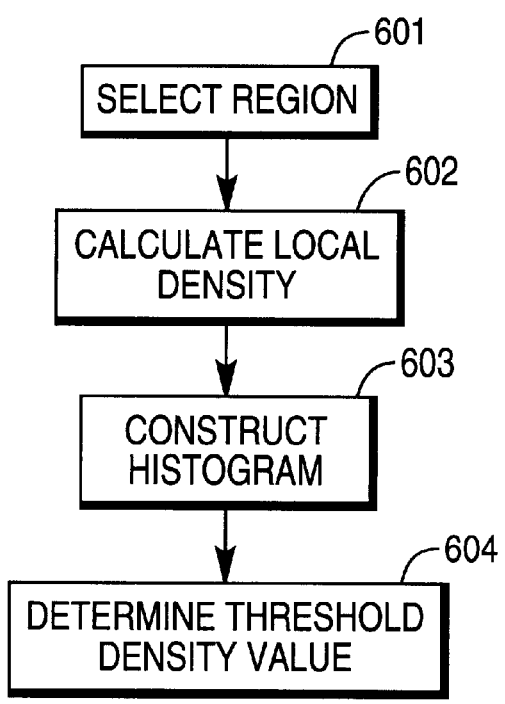
FIG. 6 illustrates a density filter analysis process that may be performed by the present invention.

To implement the density filter, the CPU 101 may perform the following steps, also depicted in FIG. 6. The reference numerals in [brackets] below refer to the corresponding reference numerals in FIG. 6.

[601] Select a small region in the field of interest.

[602] For each pixel in that region, calculate the number of black 8-connected neighbors present. This is called the local density.

[603] Construct a histogram of the local density values.

[604] Use the histogram to find separable peaks in the density values. Obtain the local density value of the less dense peak. This is the threshold density value.

Figure 7A:
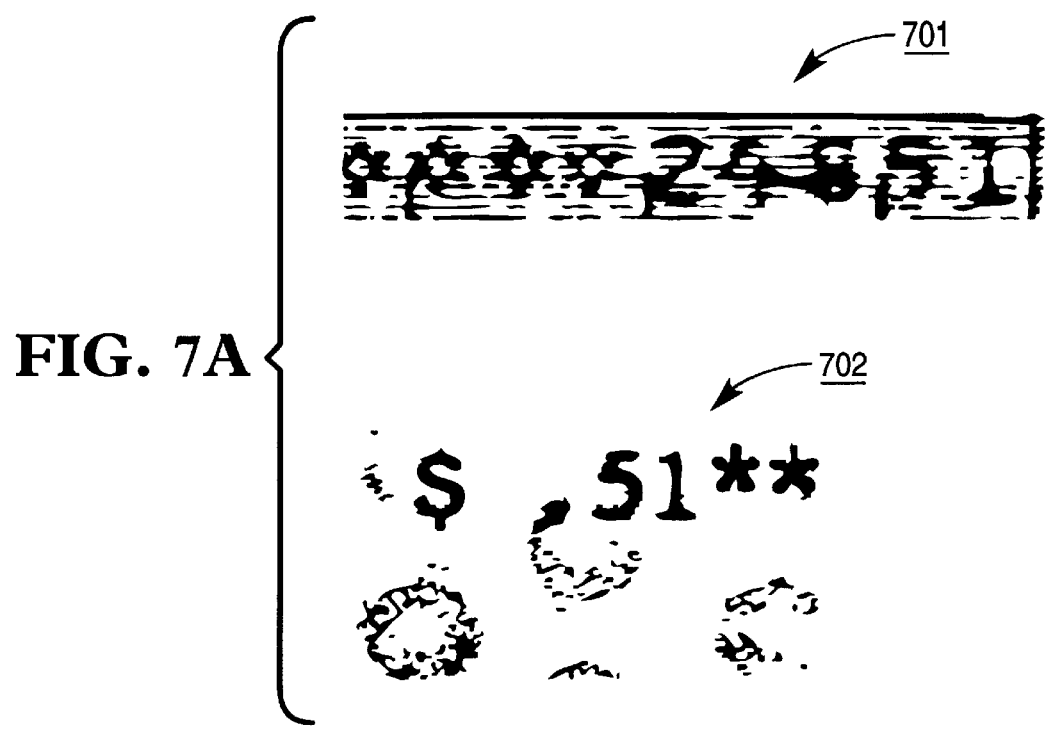
FIGS. 7A–7B illustrate a field of interest before and after being cleaned by the density filter function.
Figure 7B:
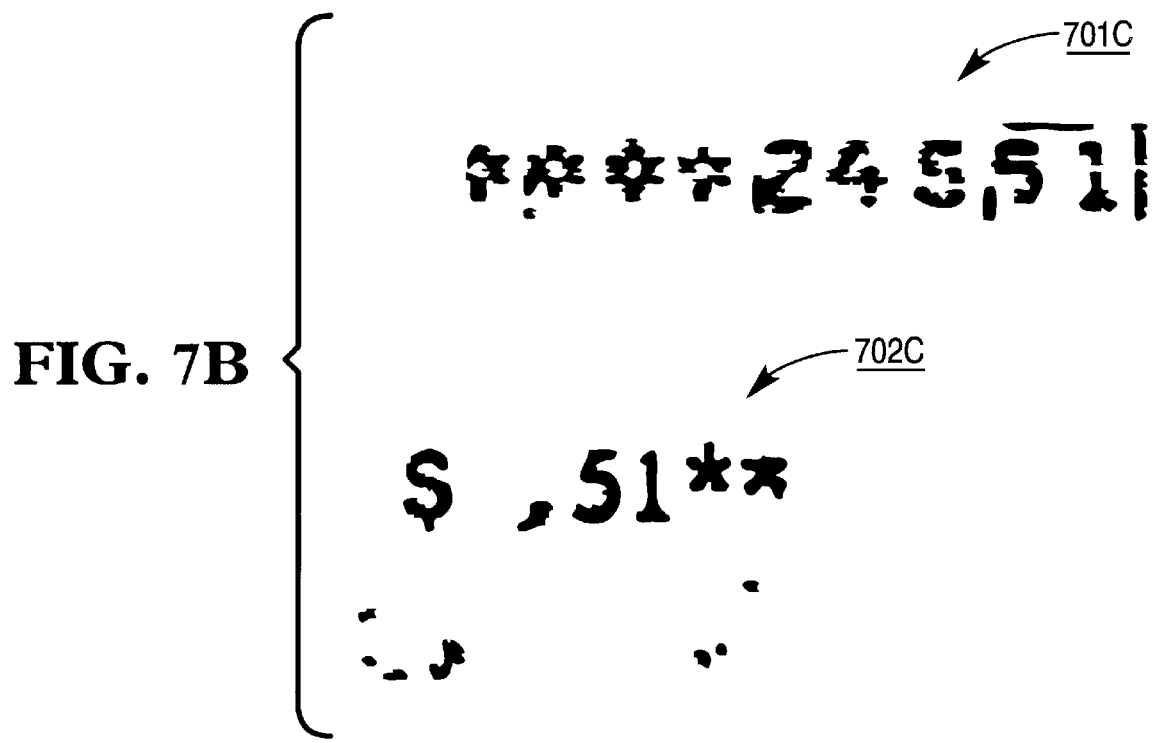

The threshold density value is the average local density of the background or noise. After the entire field is processed, each pixel in the image stored in storage device 103 that has a density less than or equal to the threshold density value is made white. FIG. 7A illustrates fields of interest 701 and 702 before "cleaning" by the density filter process of FIG. 6, and FIG. 7B illustrates the corresponding fields of interests 701C and 702C after cleaning by the density filter process of FIG. 6.

If an image is found to include broken dot matrix characters (e.g., 311, 312 of FIGS. 3A and 3B), another technique may be employed to rejoin the separated dots. This technique, called "text linking", repairs the dot matrix print so that it can be read using automatic means, such as by the system 106. The purpose behind text linking is to enhance characters that have small discontinuities, while ensuring not to interconnect separate characters. The concept behind the text linking process is straightforward:

Given a broken, dot matrix field, if two black pixels are separated by up to N white pixels, and there is no other direct black pixel path between them, turn the white pixels to black.

Where N is a value that determines the degree of separation allowed between pixels that can be joined.

Although the concept appears simple, an efficient implementation can be somewhat complicated. The implementation used in the preferred embodiment of the present invention employs a set of masks which test the values of pixels surrounding a white pixel, to determine if the pixel should be set to black. The masks are applied to every white pixel in the image (802), from left to right, top to bottom.

First, it is ensured that there is a black pixel adjoining the pixel to be tested (801). Then the first mask is applied that corresponds to the definite black pixel and the white pixel considered for linking. Using the mask for the first degree of separation it is determined if there is another black pixel (803) which could be linked to the source black pixel (801) by linking via this white pixel, ensuring that they are not already connected via an alternate path (805). If no linking occurs in the first degree then the second degree of separation is examined, until a pre-defined N degrees of separation is reached. When there is testing for greater than one pixel separation, the pixels which we know must be white (804) are taken into account—otherwise the previous masks would have linked the source and destination black pixels (801 and 803) using the white pixel(s). Examples of test masks are presented in FIGS. 8A, 8B and 8C. Table 2 below identifies the meaning behind the various squares of FIG. 2.

TABLE 2

Figure 8A:
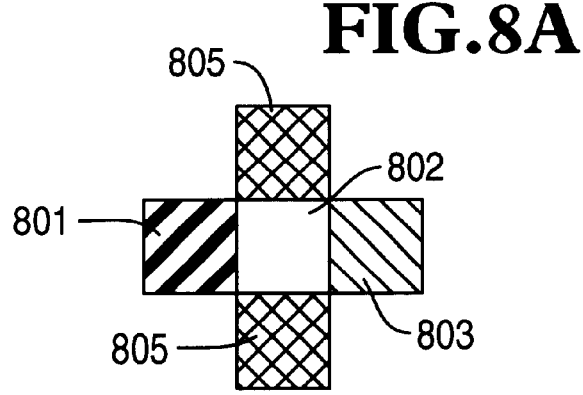
FIGS. 8A–8C illustrate sample test masks that may be used by the present invention.
Figure 8B:
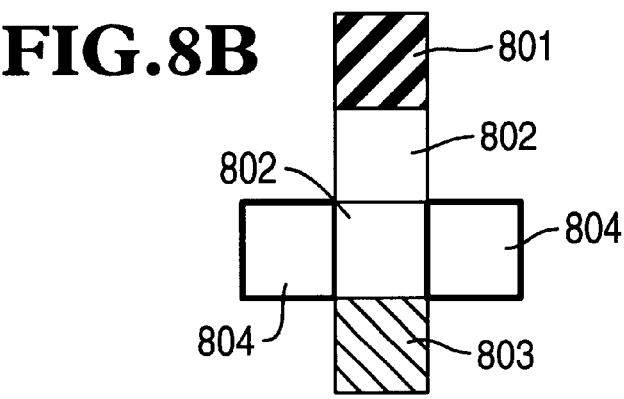
Figure 8C:
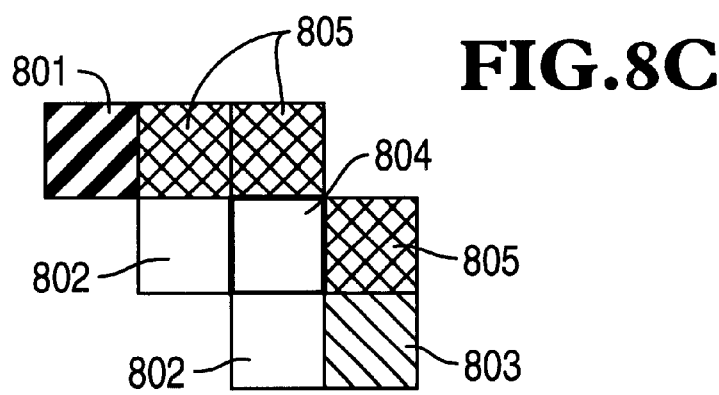
Figure 9A:
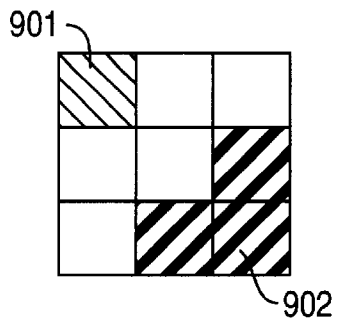
FIGS. 9A–9H illustrate various morphological filters that may be used by the present invention.
Figure 9B:
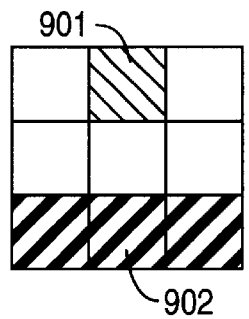
Figure 9C:
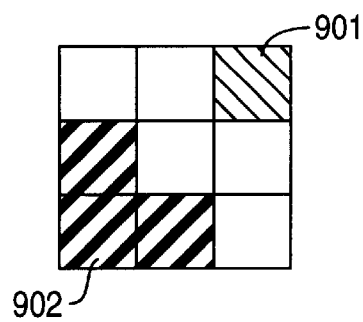
Figure 9D:
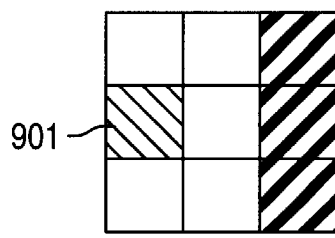
Figure 9E:
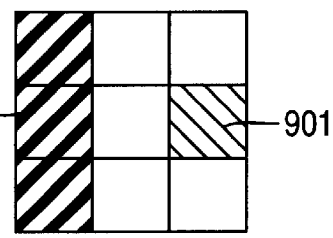
Figure 9F:
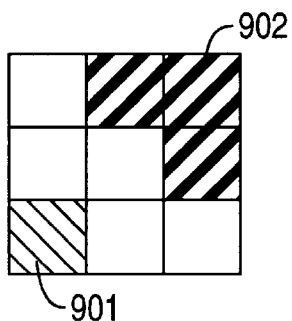
Figure 9G:
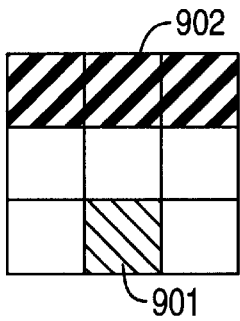
Figure 9H:
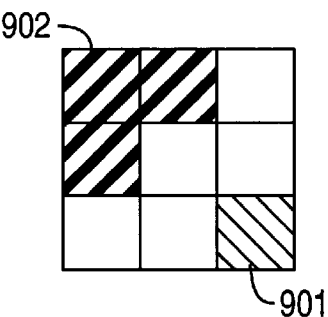

| Reference Numeral in FIGS. 8A–8C | Meaning |
| --- | --- |
| 801 | Definite Black, Source |
| 802 | Considered for Linking |
| 803 | Test for Black, Destination |
| 804 | Definite White, from previous test |
| 805 | Existing Paths Tested |

Text linking may be accomplished through the use of morphological filters, that represent the typical types of breaks encountered between segments of a character. Eight examples of these filters which cover pixels separated by only one pixel are represented in FIGS. 9A–9H.

The application of the filters in FIGS. 9A–9H to an image stored in storage device 103 employs the following logic, depicted in FIG. 10. The reference numerals in [brackets] below refer to like-numbered reference numerals in FIG. 10.

[1001] For each filter applied to a region of the image, is the center a text pixel?

[1002] If it is a text pixel, then it remains a text pixel.

[1003] Else, is the gray area 901 of the image a text pixel and any of the pixels in the black area 902 a text pixel?

[1004] If so, then the center pixel is a text pixel.

In implementation, only the first four or five of these filters (FIGS. 9A–9E) are actually needed to cover all eight cases, since the filter is applied left to right and top to bottom across the image. When we apply the filter for separations of two pixels we use the output of one pixel as the input, since more existing paths may now exist. Also, the horizontal and vertical filters (FIGS. 9B and 9D) are applied before the diagonal filters, since these text pixels will be closer together than diagonally separated pixels, and therefore should be linked first. This method was experimentally determined to be better than simple Morphological dilation (where text is the foreground), or Morphological closing (Morphological dilation followed by Morphological erosion), which are standard Image Processing techniques. As one who is practiced in the art would expect, simple Morphological dilation using a 3×3 kernel caused characters to become overly thick, and occasionally connected neighboring characters. Morphological closing, using the same kernel, tended to remove small character features.

C. Hand Print Quality Evaluation

Assessing hand written text within images is extremely difficult due to large variation in the ways text can be written. For purposes of the present invention, poor quality resulting from poor imaging, or binarization, is identified, and not the way text was originally written. One manifestation of poor quality is that the image contains many broken strokes, or contains excessive amount of non-textural content. However, it is sometimes difficult to tell whether a component is a broken stroke or part of background noise, without knowing what real characters look like. The methods described herein approaches this problem in a heuristic manner—in a sense, the way human eyes separate information from noise is minimized. These heuristics include how uniformly the components are laid out, how much in size the components vary, how thick the strokes are, etc. These perceptions are modeled in mathematical terms or parameters and classify the image quality based on these parameters. The classifier is trained based on human input quality measures.

In the following sections, we will first describe in detail the approach used to assess quality of a courtesy zone, and then show the results from batch tests. In order to evaluate the quality of hand printed characters, etc., within an image of a document (e.g., 313 of FIG. 3C), the process described below with respect to FIG. 14 has been developed. The reference numerals in [brackets] below refer to like-numbered reference numerals in FIG. 14.

[1401] The input into the process of FIG. 14 is a list of connected components, generated as described previously. This makes the algorithms very efficient because no pixel level operations are necessary. Before extracting features, noise and non-text components (or "blobs") in the image have to be located and removed, so that they are not confused with the actual blobs that make up the text of interest. The amount of noise components and their location may also be a good indicator for the quality of the image zone.

[1402] The feature extraction module computes various features, or attributes, based on the connected component information in the image zone, and these features are selected based on visual examination of a large set of images, and experimentation.

[1403] The classification module takes the features computed previously as inputs, and output the quality measure for the given zone image, either good or bad.

The goal of the noise identification and removal module 1401 is to accurately identify the components in the zone that are clearly not a part of a hand print characters. The following is a list of obvious noise components, and the methods used to identify them:

Segments of horizontal and vertical lines. These are typically from the rectangular box surrounding the courtesy zones (e.g., 221 in FIG. 2B). In order to identify these segments, thresholds for maximum thickness and minimum length for the lines that we want to remove are first set. Only the segments that meet these thresholds are considered a horizontal or vertical line. FIG. 15A shows an example of the zone images before (1501) and after (1502) the line removal.

Segments that are extremely large. These large segments are usually the result of bleeding ink, stamped back, or other add-on noise after the check was written.

Segments that are extremely small. Again, thresholds need to be set for minimum allowable width, height, and area for a text segment. Only the small segments that are remote are removed, i.e., they are close to the top or bottom edge, or far away from any other blobs in the zone. The distance test is important, because a segment of relevant text should not be removed by mistake. FIG. 15B shows an example of the zone images before (1503) and after (1504) the noise removal.

The feature extraction module 1402 takes the filtered connected components as input. The following features may be used:

Percentage of noise components contained in the zone. The higher the percentage, the more likely the zone is of bad quality.

Percentage of foreground pixel mass in the noise components.

The variance of the height of the non-noise blobs. A smaller variance in height usually indicates better quality.

The horizontal alignment of the non-noise blobs. If a zone contains little noise, each blob should represent a character; and therefore its center should be substantially aligned horizontally. The only exception to this is when the cent field is printed as a fraction.

The severity of overlapping between bounding rectangular boxes of different blobs. A large degree of overlapping usually means that the some of the blobs are segments of a character, or noise, instead of whole characters.

The severity of vertical stacking of bounding rectangular boxes of different blobs. Reasoning is the same as above.

The estimate of average stroke width. If average stroke width is very small (e.g., <3), it is likely that the image was poorly thresholded and contains broken characters.

The number of blobs that are likely to be segments of broken strokes. These blobs are identified by checking their size, proximity to other blobs, as well as their location. A broken stroke is usually small, but close to another blob. Also it is not likely to be close to the boundary of the zone. The location parameter is important because frequently a badly thresholded bounding box around the zone also contains fragmented pieces, and we don't want to take that into account while assessing the quality for the text.

With respect to the classification module 1403, since there are many features that contribute to the quality measure, and there is no clear and simple rules, a neural network based classification method is suitable for this function. A total of 11 raw features extracted from the zone image as described in the previous section may be used. Before applying the neural classifier, principal component decomposition may be used to sort the data into an orthogonal space, meanwhile reducing the dimension of the data. The compressed feature data are used to train the neural classifier and they provide better performance than the raw feature data.

A backpropagation net with 8 units, 5 hidden units, and 1 output unit may be used. The training is performed on a set of 500 images, with human defined quality measures for each of them.

D. Signature Quality Evaluation

A process is described below for automatically evaluating the quality of binary signatures within an image (e.g., stored with storage device 103) for both personal (e.g., FIG. 2A) and business checks (e.g., FIG. 2B). The evaluation can first lead to a characterization of the image background (noisy, clean . . . ) and second to the quality and the spatial localization of the signature within the image. This process can be used as feedback to repair or reject the analyzed image, so that the ability to identify and locate relevant information in the document can be improved.

Figure 16:
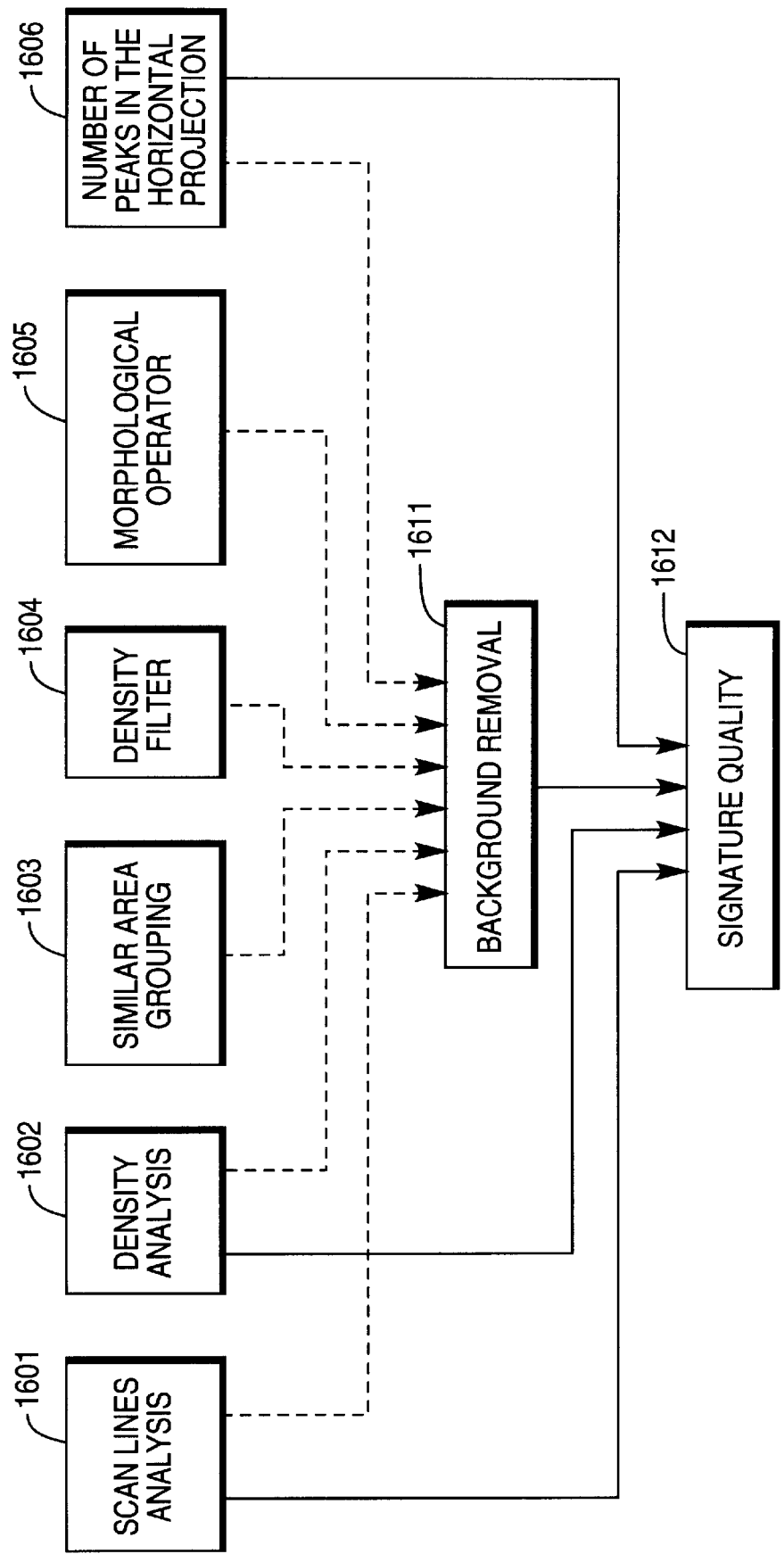
FIG. 16 illustrates an overall signature quality evaluation process.

FIG. 16 depicts the overall signature quality evaluation process. The horizontal projection of the image is first computed. The number of the significant peaks in the derivative of the projection is used as first information about the background features. The scan lines analysis together with the density analysis decide if the background is clean, noisy or formed from heavy background patterns. According to the computed information in the previous steps, the algorithm selects the appropriate method for removing undesired background patterns or deciding that the image is clean and the signature is fragmented or connected. Since signature zones tend to have significant backgrounds, we have started with background removal process 1611, also described previously in other contexts. Background removal 1611 will be required before methods can be applied to evaluate the quality of the signature.

It is noted that signature backgrounds tend to fall into three categories:

Those with patterns that are "lighter" than the signature (e.g. noise).

Those with linear patterns.

Those with patterns formed from short, random curves (e.g., stamped signature).

It has been determined that density analysis 1602, 1604 (analogous to the density analysis described previously with respect to FIG. 6) can be used to identify and remove the background of the images of the first category. Morphological operators 1605 can be used to remove linear patterns from the background of the images of the second category. For the third category, a random pattern removal method may be implemented based on the clustering of patterns of similar size. This method provides good results with images with significant background.

The analysis of the maxima of the horizontal and the vertical projections is used to automatically classify the images into three categories:

Image with clean or with light background, image with significant border and heavy background, image with heavy background but without border.

The selection of the appropriate background removal method is based on the analysis of the density and scan lines (1602, 1601) of a reduced size image window. Whenever a good peak is detected in this later characterization, all those elements that fall under the peak are treated as an isolated set. This approach can segment the signature from the noise.

The result of the background characterization process is used to group (1603) features that are similar in physical attributes, such as density or size. Features that lie along a common line or smooth curve are also grouped together. These grouping processes lead to the segmentation of the signature from the background. The signature quality and the spatial localization of the signature in the image are then obtained.

In the next section a discussion is provided as to how the number of maxima in the horizontal projection (1606) can be used to classify the background into clean, light or heavy. After background classification, the appropriate method to remove the undesired patterns is chosen. This is the subject of the subsequent sections, which describe respectively density analysis 1602, scan lines analysis 1601 and similar size area grouping processes.

Figure 17:
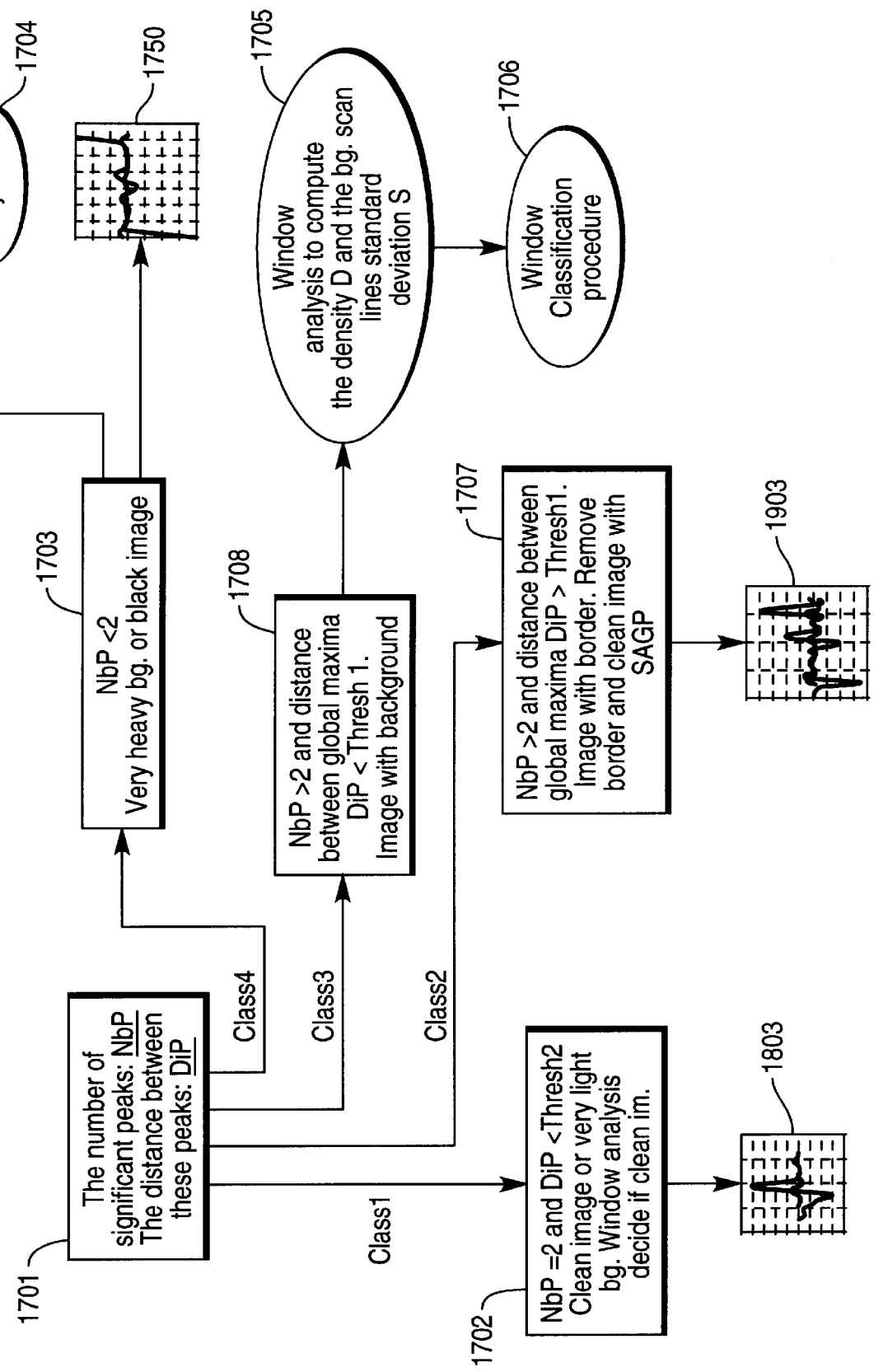
FIG. 17 illustrates a process for classifying an image background based on the number of local maxima.

FIG. 17 illustrates that based on the number of local maxima the image background can be classified into heavy, light or clean. In step 1701, the number of the significant peaks in the first derivative of the projection (NbP) is used to identify if there is noise, large patterns or clean background. FIGS. 18A–18C depict an example signature image 1801 (FIG. 18A), the horizontal projection 1802 for the signature image 1801 (FIG. 18B), and the derivative 1803 of the horizontal projection 1802 (FIG. 18C). In these figures, the horizontal axis represents the height of the image, and the vertical axis represents the magnitude of the derivative of the horizontal projection. Likewise, FIGS. 19A–19C depict an example signature image 1901 (FIG. 19A), the horizontal projection 1902 for the signature image 1901 (FIG. 19B), and the derivative 1903 of the horizontal projection 1902 (FIG. 19C). Again, the horizontal axis represents the height of the image, and the vertical axis represents the magnitude of the derivative of the horizontal projection.

In step 1702, if a clean background or only light noise is identified, such as in the signature image 1801, then the projection contains only two significant peaks (1802 in FIG. 18B). In this case the significant peaks are very close to each other. The derivative 1803 is therefore shown in both FIG. 18C and FIG. 17. In step 1703, when there is less than two peaks, and this peak is situated in the border of the image, this is usually the case of very heavy background or a black image. As shown in FIG. 17, this case is rejected 1704, and is not further processed (in one embodiment). The derivative 1750 of the horizontal projection in this case is also shown. Likewise, the derivative 1903 corresponding to step 1707 is shown.

Images with a heavy background usually have a horizontal projection with several significant maxima (e.g., see FIG. 19B). The derivative of the horizontal projection for this case is used to search the most significant peak (e.g., see FIG. 19C). Note that in FIG. 19C the most important maxima are situated in the border. This usually is the case of a stamped signature, such as the signature image 1901.

The horizontal projection analysis is then used to decide if the image background is clean or needs to be processed. The case where the local maxima number is higher than two (step 1708 in FIG. 17) is of a particular interest. It indicates the presence of background features in the images. In the next step of the signature quality evaluation process 1612 (step 1705 in FIG. 17), a reduced size window is selected and the image background is analyzed. Step 1706 decides on the method to be used in the background removal task.

Figure 20:
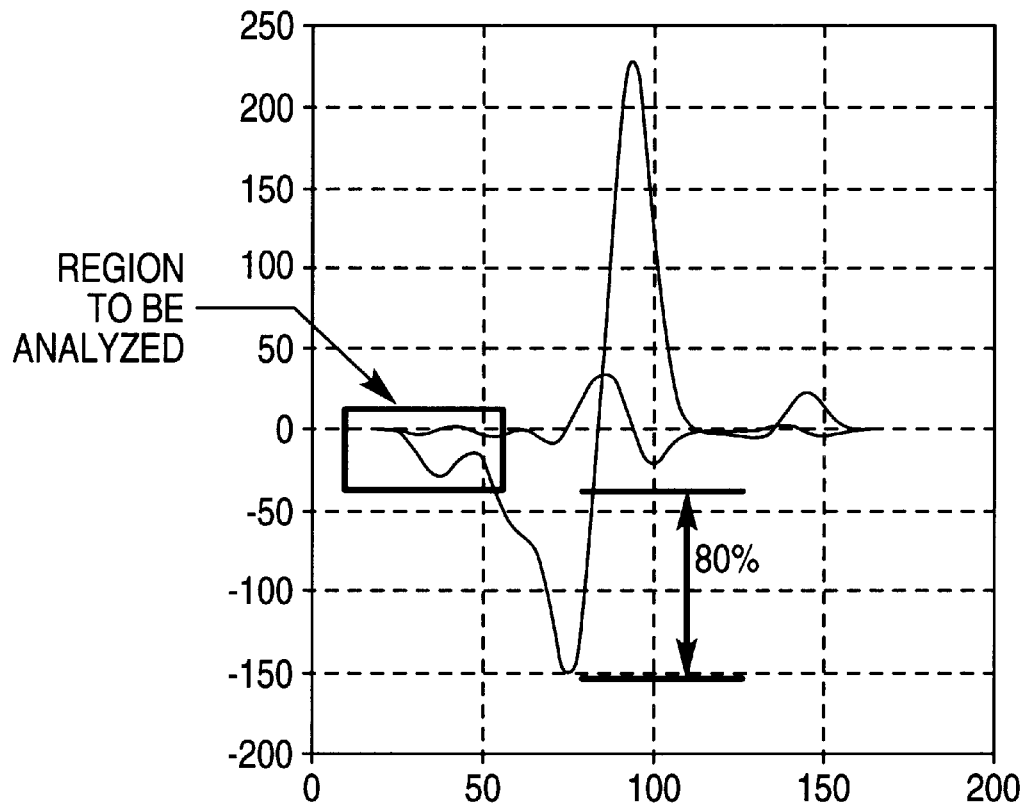
FIG. 20 illustrates a process of selecting a window with gradient magnitude less then 80% of the global maxima magnitude.

This step of the algorithm needs a small image window to be analyzed and to supply information about the distribution of the background patterns. A region where the magnitude of the derivative of the projection is less than 80% of the global maxima contains usually more information about the background than about the signature. This zone is selected and considered as a representative set of the background features. In FIG. 20, the process of selecting a window with gradient magnitude less then 80% of the global maxima magnitude is shown.

The next step in signature analysis to determine the distribution of the background patterns within the image (1601 in FIG. 16). The standard deviation (STD) of the black pixels in one scan line can determine how well these pixels are distributed along the line: uniformly distributed or clustered. The change of the STD from one scan line to another can determine if the lines are correlated. Table 3 below illustrates some experimental results obtained from images with different backgrounds. It is noted that a low STD value usually indicates the presence of a uniform distribution. In other words there is no significant change from one line to another. This is the case of the background with noise uniformly distributed over the image. A high STD value indicates that something is happening from one line to another. When the background is formed from line patterns and the window is crossed from one scan line to another, variation can be encountered from black to white or from white to black.

Table 3 also shows the mean of the scan lines in the window. The strength of the mean describes the density of the background. The STD indicates how these patterns are distributed inside the window.

TABLE 3

| Mean | STD | Background Description |
| --- | --- | --- |
| 0.3 | 0.05 | Some dots + signature segments |
| 0.21 | 0.0428 | Only background Noise |
| 0.317 | 0.051 | Uniformly Distributed noise |
| 0.366 | 0.0369 | Segment of thin lines |
| 0.181 | 0.160 | Lines |
| 0.405 | 0.070 | Background noise and/or signature segments |
| 0.109 | 0.049 | Only signature segments |
| 0.368 | 0.110 | Lines |

Figure 21:
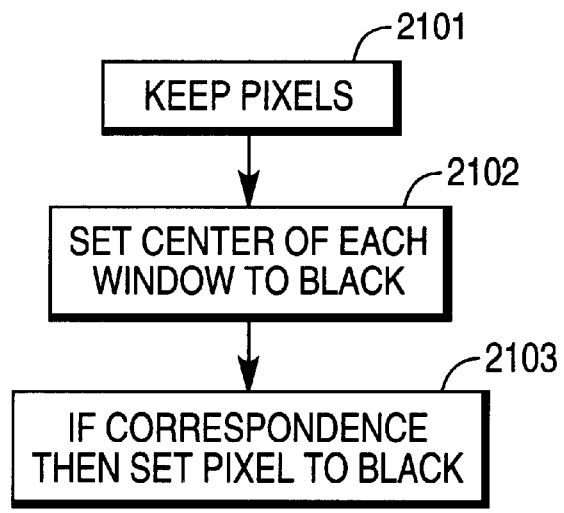
FIG. 21 illustrates a summarized process performed by a density filter.

The density filter 1604 can be summarized into the following three steps, depicted in FIG. 21. Again, reference numerals in [brackets] correspond to like-numbered reference numerals of FIG. 21:

[2101] Keep only those pixels that are the center of 3×3 window and for which there is only 0 or 1 white pixel in the corresponding window in the original image. This step will produce an image Im1 (e.g., Image number 1) free of noise, but will also fragment the signature if there is "weak thin" link between the different parts.

[2102] Set the center of each window of an image Im2 (e.g., Image number 2) to black if there is at least one black pixel in the corresponding window in the image Im1. This step will make thick all the remaining points from step 2101, and will help to restore the eroded points in the first step. image Im2 will have features with almost similar thickness as the original image.

[2103] If the pixel is black in image Im2, and the corresponding pixel in the original image is also black, then set the pixel to black in the output image. This will select the points that are present in the original image and reject those added by step 2102.

Figure 22:
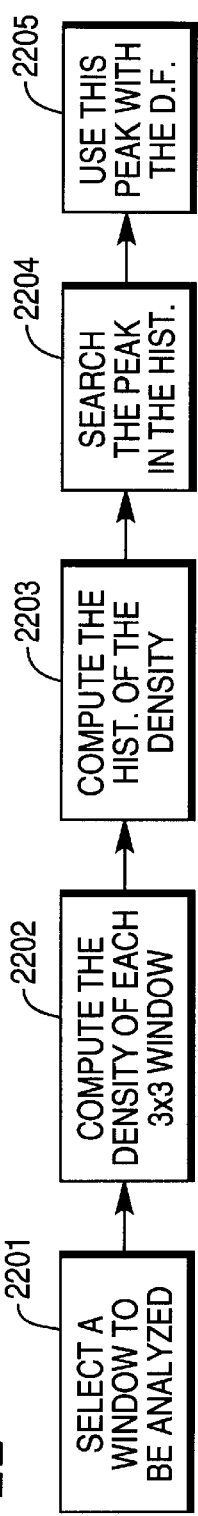
FIG. 22 illustrates in further detail the process of density analysis.

The above-described density filter 1604 works very well when the background is formed from features with density smaller than the density of the signature FIG. 22 illustrates in further detail the process of density analysis 1601. This process can be summarized as follows:

[2201] Select a window to be analyzed.

[2202] Compute the number of black pixels inside each 3×3 square inside the selected window.

[2203] Build the histogram of this later measure.

[2204] Search for the peak in the histogram. The largest peak in this histogram represents the dominant density in the background.

[2205] This value is used to automatically adjust the parameters of the density filter 1604 and/or the morphological operator 1605.

The process of FIG. 22 tends to group features of the same density together. Whenever a good peak is detected in the density histogram, the corresponding density value is used as parameter for the density filter 1604 or the morphological operators 1605. In fact if the dominant density is equal to 1 or 2, the density filter 1604 is used with this parameter. When the dominant density is equal to 3, the morphological operators 1605 are used. And when the dominant density is higher than 3, the similar area size grouping (SAGP) process 1603 (described in further detail below) is used to remove the background patterns.

The SAGP process 1603 can be considered as a grouping operation as well as an operation for characterizing sets of elements. In fact, based on the human observation, the following background patterns grouping rules are suggested: (1) Features that are similar in physical attributes, such as density or size can be grouped together, and (2) features that lie along a common line or smooth curve can be grouped together.

The SAGP process first computes the area size of each element in the background and then the histogram of these later quantities. Whenever a good peak is detected in the histogram, all those elements that fall under the peak are treated as an isolated set. This approach can segment larger elements (e.g. the signature) from a field of smaller ones (e.g. noise). In other words, elements are first segmented according to the peak in the histogram of the properties considered by the background description operations, and are then considered in terms of these segmented sets. The limitation of this approach is that the segmentation can seemingly be disrupted by changing the shape of the distribution of the background patterns.

Figure 23:
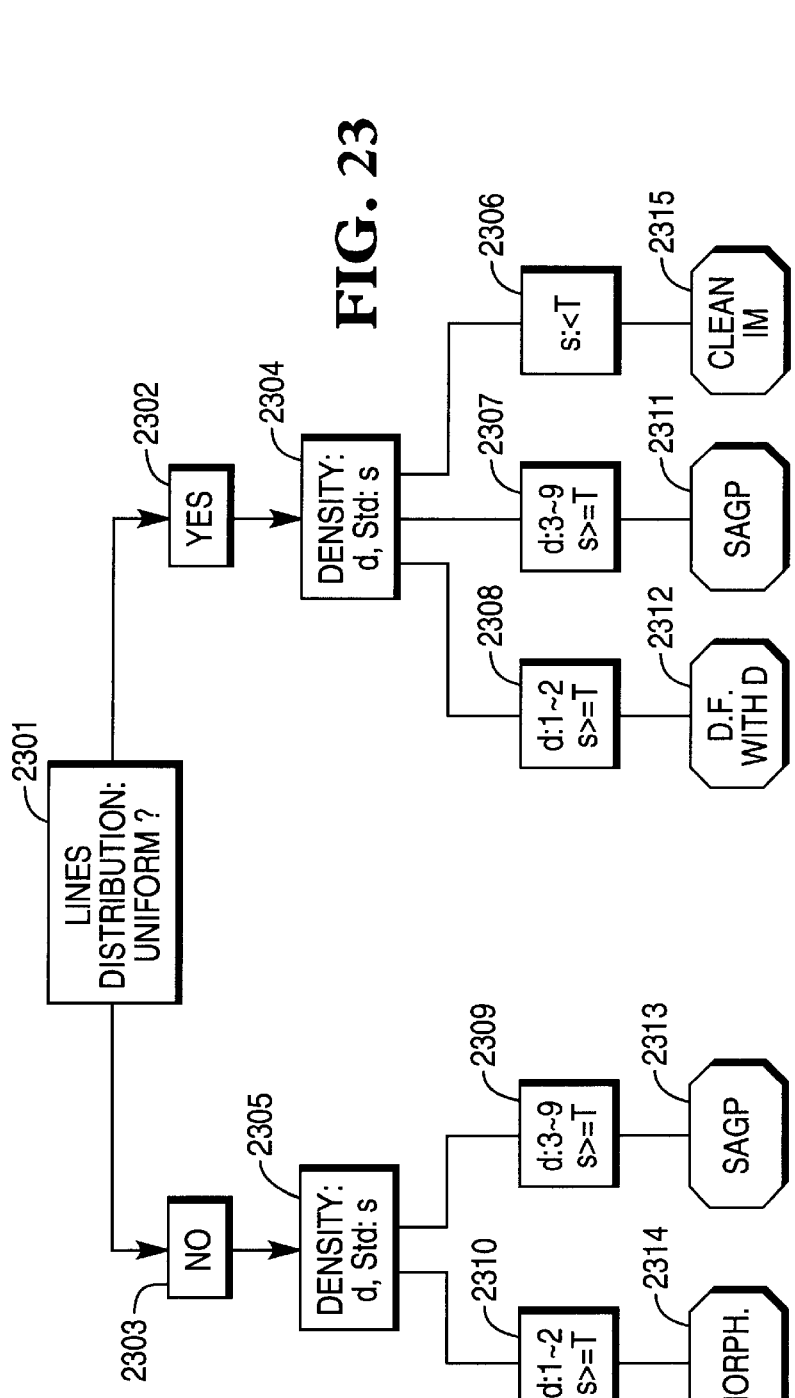
FIG. 23 illustrates a procedure for the automatic selection of a background removal method.

FIG. 23 illustrates the complete procedure for the automatic selection of the background removal method and how the information described in Table 3 is used in this procedure. First, in step 2301, a query is made whether the lines distribution is uniform. If Yes (step 2302), then the standard deviation "s" and density "d" are computed in step 2304, as described in further detail elsewhere. In step 2306, if s <T, then step 2315 is encountered, indicating that the image is clean, and no further processing is required ("T" is a fixed threshold). In step 2307, if 3≦d≦9 and s≧T. then step 2311 is encountered, and the SAGP (similar area grouping algorithm) is used in the background removal process. In step 2308, if 1≦d≦2 and s≧T. then step 2312 is encountered, and the density filter is used in the background removal process with "d" as dominant density parameter.

If the lines distribution is not uniform (e.g., step 2303), then in step 2305 the standard deviation "s" and density "d" are computed as before. In step 2309, if 3≦d≦9 and s≧T. then step 2313 is encountered, and like in step 2311, the SAGP (similar area grouping algorithm) is used in the background removal process. In step 2310, if 1≦d≦2 and s≧T. then step 2314 is encountered, and the morphological operator is used in the background removal process.

Figure 24A:
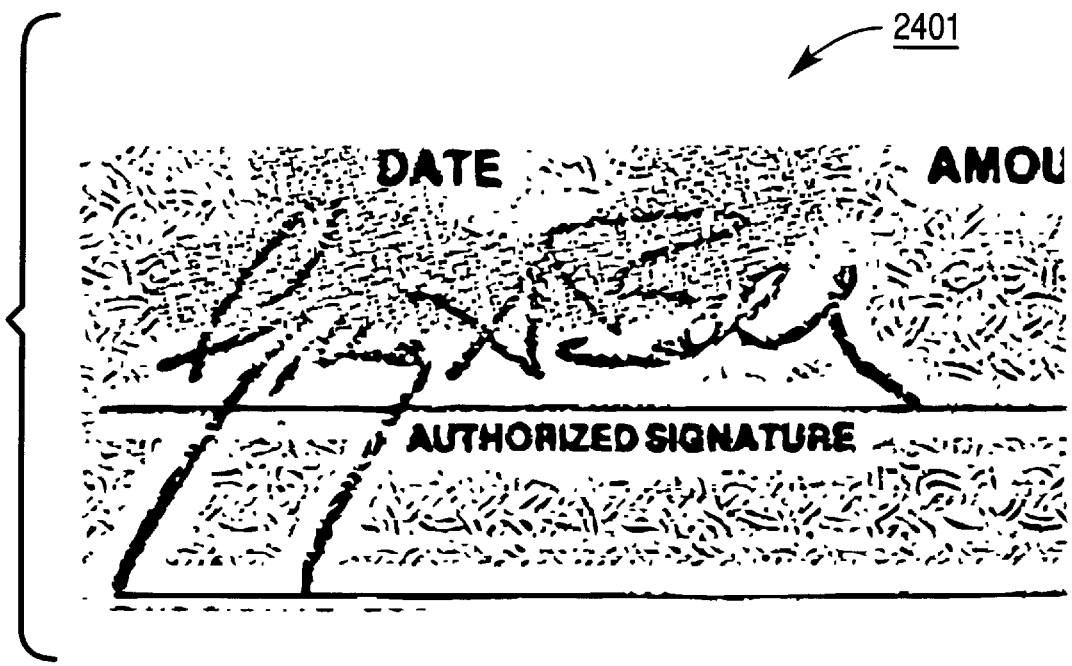
FIGS. 24A–24B, 25A–25B and 26A–26B illustrate before and after signature quality analysis images.
Figure 25A:
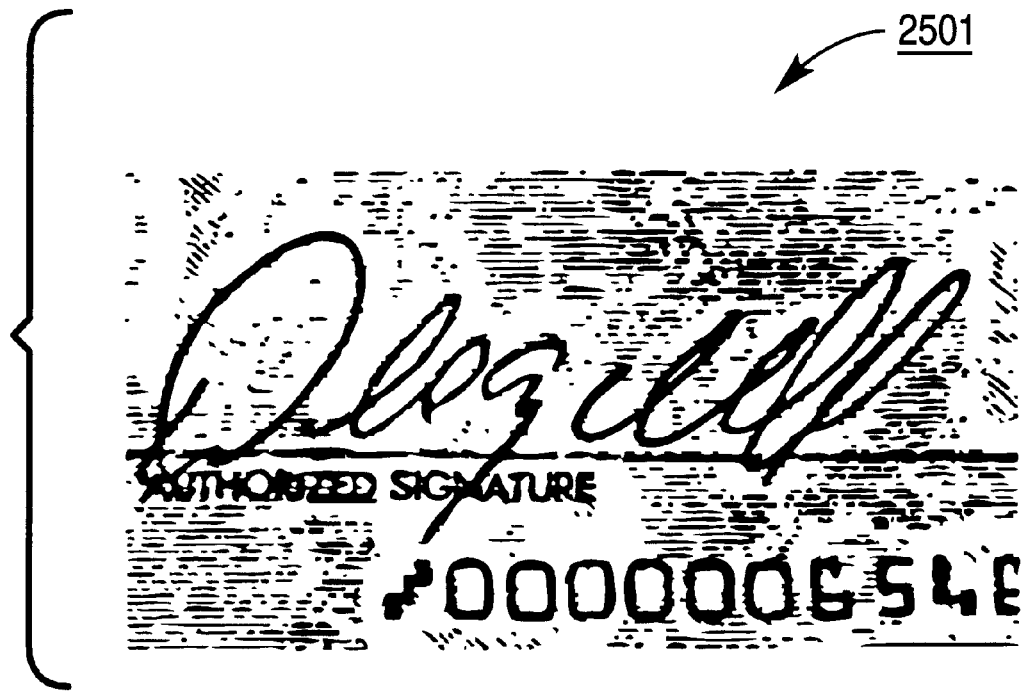
Figure 26A:
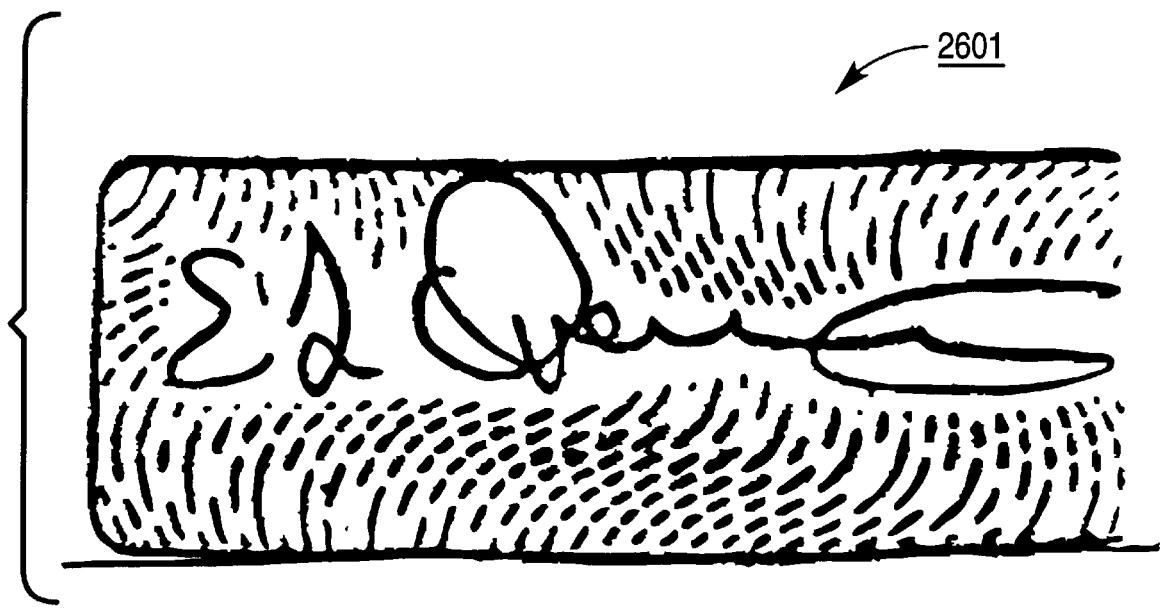

In order to illustrate the operation of signature quality analysis, three types of images will be considered, shown as images 2401, 2501 and 2601 in FIGS. 24A, 25A and 26A, respectively. The algorithm of FIG. 23 selects to process these images with the density filter 1604, the morphological operators 1605 and the similar area grouping process 1603, respectively.

Figure 24B:
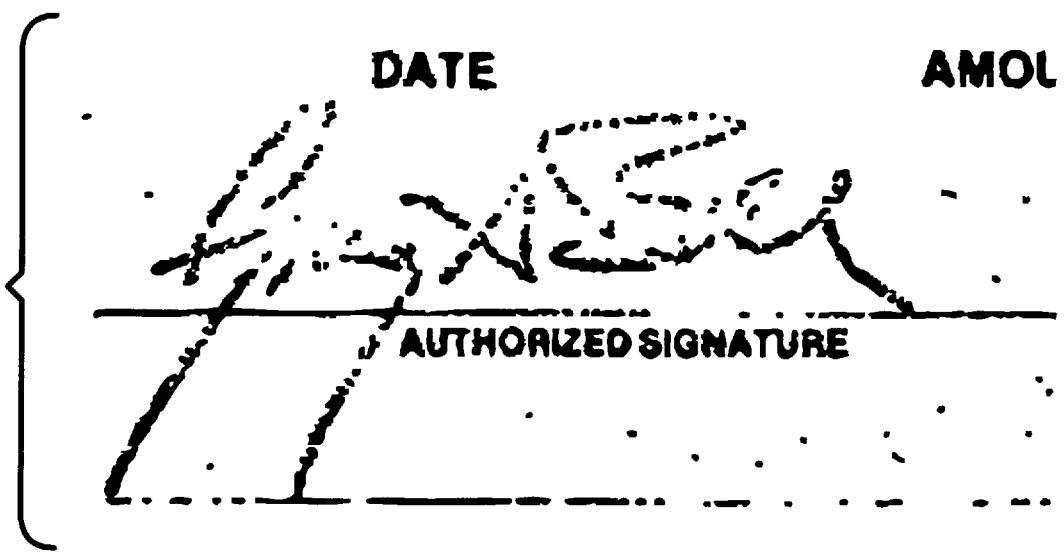

Image 2401 of FIG. 24A is an image that was selected to be processed by the density filter of the present invention. Image 2402 of FIG. 24B shows the resulting image. The process identifies that the signature is not well connected. Note that this image can be processed by the similar area grouping process 1603 because of the fragmentation of the different parts of the signature.

Figure 25B:
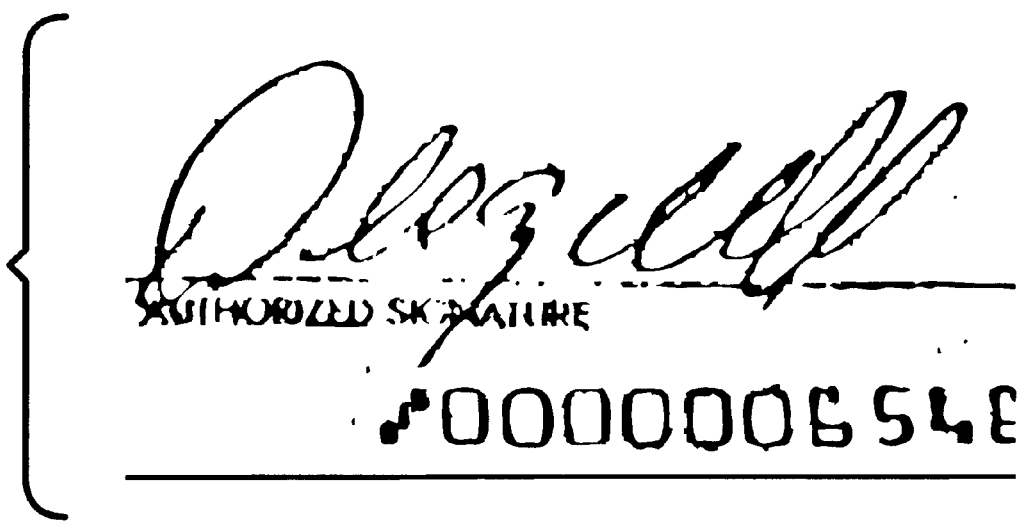

The second example shown as image 2501 in FIG. 25A. In image 2501, the background is mostly formed from linear patterns and light noise. The process of the present invention selects to process this image with the morphological operators 1605. The dominant density of the background of this image is equal to 3. Note that this image can be processed with the SAGP process 1603. Indeed, the signature is well connected and the background patterns fall under an isolated peak. After background removal, the signature is classified as well connected (image 2502 of FIG. 25B).

Figure 26B:
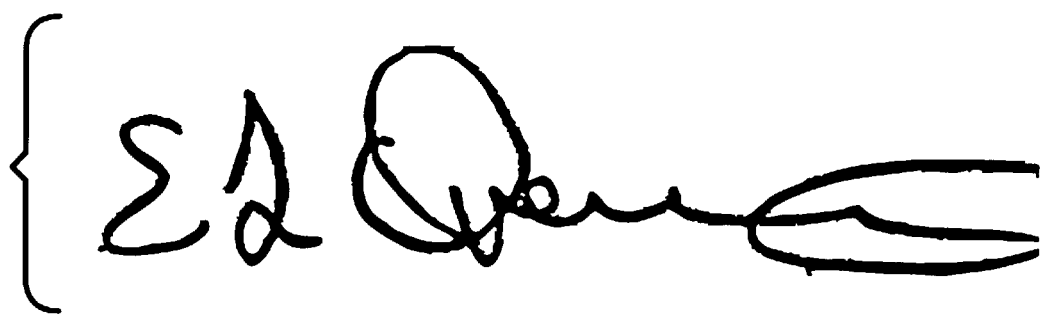

The last image 2601 of FIG. 26A is processed with the SAGP process 1603. The resulting image after background removal is shown as image 2602 in FIG. 26B. After background removal, the process recognizes that the image 2602 is clean and the signature is connected. It is not possible for the density filter 1604 or the morphological operators 1605 to remove the background of this image 2601 without removing some parts of the signature. In fact, the density of the signature features and the background features are very similar. The SAGP process 1603 is very efficient for this kind of image—the signature is well connected and the background features fall under the same peak of the histogram of the size of the features in the image.

The present invention has been described previously in a preferred embodiment. It will be understood by those having ordinary skill in the art that the present invention may be implemented in a variety of ways, while still remaining within the scope of the claims set forth below.

What is claimed is:

1. A system for removing a background pattern from a binary image, comprising:
  (a) means for storing the binary image;
  (b) processing means for performing the steps of:
    (i) dividing the binary image stored in the storing means into a plurality of stored image regions;
    (ii) for each of the plurality of stored image regions, calculating the image density value associated with such stored image region, wherein the step of calculating the image density value associated with a stored image region includes the step of performing an image quality assessment of the stored image region by performing an eight-connection component analysis of the stored image region;
    (iii) counting the number of stored image regions associated with each image density value;
    (iv) identifying the image density values having the maximum number of associated stored image regions;
    (v) selecting as a threshold density from the identified image density values a value less dense than the values having the maximum number of associated stored image regions;
    (vi) resetting each stored image region stored in the storage means having a density value less than or equal to the threshold density value to a zero value; and
    (vii) calculating the total number of eight-connected components within a field-of-interest, wherein if the calculated number of eight-connected components is greater than a predetermined maximum threshold value or lower than a predetermined minimum threshold then the field-of-interest image is classified as a poor quality image.

2. A system for removing a background pattern from a binary image, comprising:
  (a) means for storing the binary image;
  (b) processing means for performing the steps of:
    (i) dividing the binary image stored in the storing means into a plurality of stored image regions;
    (ii) for each of the plurality of stored image regions, calculating the image density value associated with such stored image region, wherein the step of calculating the image density value associated with a stored image region includes the step of performing an image quality assessment of the stored image region by performing an eight-connection component analysis of the stored image region;
    (iii) counting the number of stored image regions associated with each image density value;
    (iv) identifying the image density values having the maximum number of associated stored image regions;
    (v) selecting as a threshold density from the identified image density values a value less dense than the values having the maximum number of associated stored image regions; and
    (vi) resetting each stored image region stored in the storage means having a density value less than or equal to the threshold density value to a zero value; and
    (vii) determining the number of pixels per eight-connected component within a field-of-interest, wherein if the determined number of pixels per eight-connected component is greater than or lower than a predetermined minimum threshold value the field-of-interest image may be classified as a poor quality image.

3. A system for removing a background pattern from a binary image, comprising:
  (a) means for storing the binary image;
  (b) processing means for performing the steps of:
    (i) dividing the binary image stored in the storing means into a plurality of stored image regions;
    (ii) for each of the plurality of stored image regions, calculating the image density value associated with such stored image region, wherein the step of calculating the image density value associated with a stored image region includes the step of performing an image quality assessment of the stored image region by performing an eight-connection component analysis of the stored image region;

(iii) counting the number of stored image regions associated with each image density value;

(iv) identifying the image density values having the maximum number of associated stored image regions;

(v) selecting as a threshold density from the identified image density values a value less dense than the values having the maximum number of associated stored image regions;

(vi) resetting each stored image region, stored in the storage means having a density value less than or equal to the threshold density value to a zero value;

(vii) calculating total number of eight-connected components within a field-of-interest;

(viii) generating a histogram that is representative of a density of eight-connected components located within the field-of-interest, wherein the generated histogram is utilized to discern separable peaks located within the calculated density value of eight-connected components; and (ix) generating a histogram that is representative of a density of eight-connected components located within the field-of-interest, the generated histogram being utilized to discern separable peaks located within the calculated density value of eight-connected components, wherein the threshold value is the calculated value of the least dense peak of the calculated density value of the analyzed eight-connected components.

4. A method for the removal of background patterns from a binary image comprising the steps of:

(a) storing a binary image within an image storage device;

(b) dividing the stored binary image into a plurality of stored image regions;

(c) calculating the image density value of each stored image region;

(d) identifying the image density values that have the maximum number of associated stored image regions;

(e) selecting as a threshold density for the identified image density values a value less dense than the values having the maximum number of associated stored image regions;

(f) resetting the stored image region to a zero value for each stored image region stored in the storage means having a density value less than or equal to the threshold density value;

(g) calculating the total number of eight-connected components within a field-of-interest;

(h) generating a histogram that is representative of a density of eight-connected components located within the field-of-interest;

(i) utilizing the generated histogram to discern separable peaks located within the calculated density value of eight-connected components; and (j) determining the threshold value from the calculated value of the least dense peak of the calculated density value of the analyzed eight-connected components.

* * * * *